United States Patent
Takahashi et al.

(10) Patent No.: US 7,693,377 B2
(45) Date of Patent: Apr. 6, 2010

(54) OPTICAL FIBER MODULE AND OPTICAL DEVICE

(75) Inventors: Masanori Takahashi, Tokyo (JP); Jiro Hiroishi, Tokyo (JP); Masateru Tadakuma, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/203,796

(22) Filed: Sep. 3, 2008

(65) Prior Publication Data

US 2009/0003786 A1    Jan. 1, 2009

Related U.S. Application Data

(63) Continuation-in-part of application No. PCT/JP2007/053956, filed on Mar. 1, 2007.

(30) Foreign Application Priority Data

Mar. 3, 2006    (JP)    ............................. 2006-058562

(51) Int. Cl.
  *G02B 6/02*    (2006.01)
  *G02B 6/38*    (2006.01)
  *G02B 6/36*    (2006.01)
  *G02B 6/44*    (2006.01)
  *G02B 6/00*    (2006.01)

(52) U.S. Cl. .......................... 385/123; 385/63; 385/88; 385/89; 385/90; 385/91; 385/92; 385/94; 385/108; 385/111; 385/122; 385/134; 385/135; 385/136; 385/137; 385/140

(58) Field of Classification Search ................... 385/63, 385/88–92, 94, 108, 111, 134–137, 140, 385/122, 123
See application file for complete search history.

(56) References Cited

U.S. PATENT DOCUMENTS

| | | | |
|---|---|---|---|
| 4,923,278 A | 5/1990 | Kashyap et al. | |
| 5,007,705 A | 4/1991 | Morey et al. | |
| 5,933,561 A | 8/1999 | Sugizaki | |
| 6,215,941 B1 * | 4/2001 | Nagai et al. | 385/136 |
| 6,367,730 B1 * | 4/2002 | Talamini, Sr. | 242/388 |
| 6,643,299 B1 * | 11/2003 | Lin | 372/6 |

(Continued)

FOREIGN PATENT DOCUMENTS

EP    0 907 073 A1    4/1999

(Continued)

OTHER PUBLICATIONS

U.S. Appl. No. 12/195,839, filed Aug. 21, 2008, Taniguchi, et al.

(Continued)

*Primary Examiner*—Charlie Peng
*Assistant Examiner*—Hung Lam
(74) *Attorney, Agent, or Firm*—Oblon, Spivak, McClelland, Maier & Neustadt, L.L.P.

(57) ABSTRACT

An optical fiber module includes an optical fiber that transmits a light and a holding unit that holds the optical fiber in a state in which the optical fiber is stretched in its longitudinal direction to change optical characteristics of the optical fiber.

18 Claims, 19 Drawing Sheets

U.S. PATENT DOCUMENTS

| | | |
|---|---|---|
| 2003/0081891 A1 | 5/2003 | Schneider et al. |
| 2003/0095767 A1 | 5/2003 | Hiroishi et al. |
| 2003/0161600 A1 | 8/2003 | Mukasa |
| 2005/0163444 A1 | 7/2005 | Miyabe et al. |
| 2006/0008221 A1* | 1/2006 | Takahashi et al. ............ 385/124 |
| 2009/0257724 A1 | 10/2009 | Taniguchi et al. |

FOREIGN PATENT DOCUMENTS

| | | |
|---|---|---|
| JP | 61-500458 A | 3/1986 |
| JP | 63-58303 A | 3/1988 |
| JP | 4-367539 A | 12/1992 |
| JP | 5-502951 A | 5/1993 |
| JP | 5-249329 A | 9/1993 |
| JP | 8-101310 A | 4/1996 |
| JP | 9-301738 A | 11/1997 |
| JP | 10-206659 A | 8/1998 |
| JP | 11-160200 A | 6/1999 |
| JP | 2001-53679 A | 2/2001 |
| JP | 2002-323305 A | 11/2002 |
| JP | 2003-177266 A | 6/2003 |
| JP | 2003-241000 A | 8/2003 |
| JP | 2004-20314 A | 1/2004 |
| JP | 2004-533014 A | 10/2004 |
| JP | 2005-257984 A | 9/2005 |
| JP | 2005-301009 A | 10/2005 |
| JP | 2005-309026 A | 11/2005 |
| JP | 2005-331818 A | 12/2005 |
| JP | 2006-140730 A | 6/2006 |

OTHER PUBLICATIONS

U.S. Appl. No. 12/197,596, filed Aug. 25, 2008, Tadakuma.

Masanori Takahashi, et al., "A study of downsized silica highly non-linear fiber", The Institute of Electronics, Information and Communication Engineers Electronics Society, Sep. 7, 2005, p. 185 (lecture C-3-41) (with English Translation).

Masanori Takahashi, et al., "Investigation of reducing fiber diameter for down-sized HNLF module", IEICE Technical Report, Nov. 17, 2005, vol. 105, No. 429, pp. 23-26 (OFT2005-39) (with cover sheet).

Nazuki Honda, et al., "Newly developed an optical fiber line testing system employing termination cable with individual Brillouin frequency shift", IEICE Communications Society Conference, Sep. 7, 2005, p. 228 (lecture No. B-10-10) (with English translation).

Daisuke Iida, et al., "Fault location technique by monitoring Brillouin scattering light distribution of PDS", IEICE Communications Society Conference, Sep. 7, 2005, p. 229 (lecture B-10-11) (with English translation).

* cited by examiner

FIG.5

| CHARACTERISTICS | | FIBER | | |
|---|---|---|---|---|
| PARAMETER | UNIT | FIBER A | FIBER B | FIBER C |
| RELATIVE REFRACTIVE INDEX DIFFERENCE Δ1 | % | 2.00 | 2.80 | 2.90 |
| RELATIVE REFRACTIVE INDEX DIFFERENCE Δ2 | % | -0.55 | -0.55 | -1.00 |
| CENTER CORE DIAMETER D1 | μm | 4.50 | 4.00 | 3.65 |
| D1/D2 | | 0.40 | 0.60 | 0.55 |
| FIBER LENGTH | km | 0.3 | 0.5 | 1.0 |
| CLADDING DIAMETER | μm | 59 | 48 | 38 |
| COATING DIAMETER (SINGLE-LAYER COATING) | μm | 89 | 82 | 77 |
| ATTENUATION LOSS (@ 1550 nm) | dB/km | 0.35 | 0.83 | 1.06 |
| CHROMATIC DISPERSION (@ 1550 nm) | ps/nm/km | 0.22 | 0.15 | 0.24 |
| CHROMATIC DISPERSION SLOPE (@ 1550 nm) | ps/nm$^2$/km | 0.026 | 0.018 | 0.010 |
| ZERO-DISPERSION WAVELENGTH $\lambda_0$ | nm | 1541.7 | 1541.4 | 1525.7 |
| CUTOFF WAVELENGTH $\lambda_c$ | nm | 1160 | 1383 | 1359 |
| MODE FIELD DIAMETER (@ 1550nm) | μm | 4.7 | 4.1 | 3.5 |
| EFFECTIVE AREA $A_{eff}$ (@ 1550 nm) | μm$^2$ | 14.8 | 11.2 | 10.2 |
| BENDING LOSS (WINDING DIAMETER 20 mm, @ 1550 nm) | dB/m | <0.01 | <0.01 | <0.01 |
| NONLINEAR COEFFICIENT $\gamma$ | W$^{-1}$ | 11.1 | 17.9 | 23.3 |

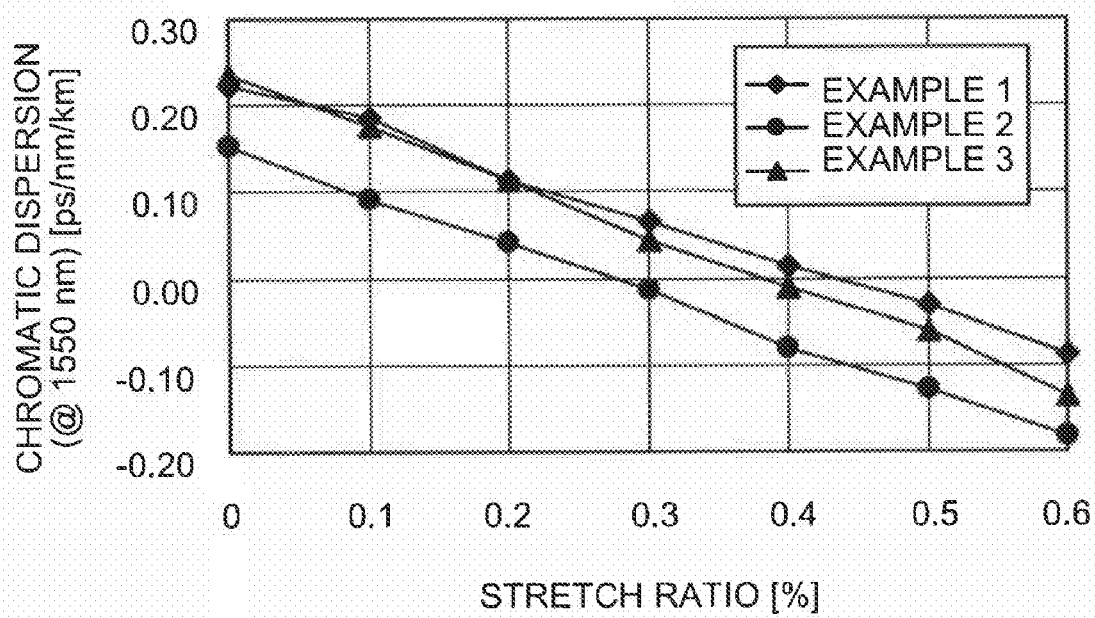
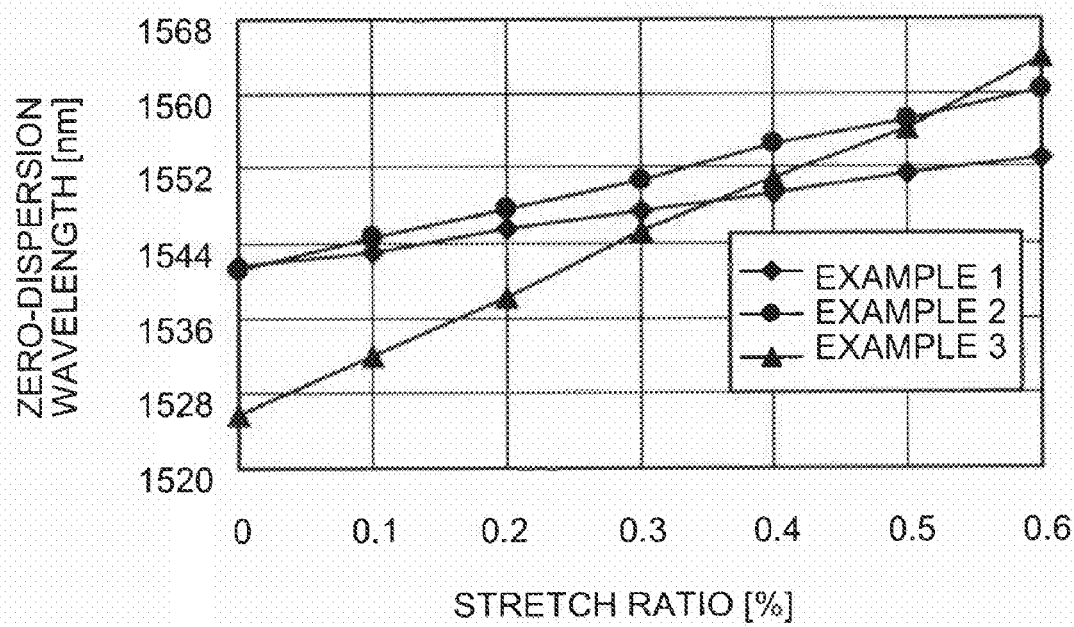

FIG.27

| CHARACTERISTICS | | FIBER | |
|---|---|---|---|
| PARAMETER | UNIT | FIBER D | FIBER E |
| RELATIVE REFRACTIVE INDEX DIFFERENCE Δ1 | % | 2.00 | 2.90 |
| RELATIVE REFRACTIVE INDEX DIFFERENCE Δ2 | % | -0.55 | -1.00 |
| CENTER CORE DIAMETER D1 | μm | 4.50 | 3.65 |
| D1/D2 | | 0.40 | 0.55 |
| FIBER LENGTH | m | 120 | 120 |
| CLADDING DIAMETER (IN) | μm | 71.6 | 64.0 |
| CLADDING DIAMETER (OUT) | μm | 71.2 | 63.7 |
| COATING DIAMETER | μm | 97 | 92 |
| ATTENUATION LOSS (@ 1550 nm) | dB/km | 0.39 | 1.53 |
| CHROMATIC DISPERSION (@ 1550 nm) | ps/nm/km | 0.17 | 0.69 |
| CUTOFF WAVELENGTH $\lambda_c$ | nm | <1300 | <1300 |
| MODE FIELD DIAMETER (@ 1550nm) | μm | 4.7 | 3.5 |
| EFFECTIVE AREA $A_{eff}$ (@ 1550 nm) | μm² | 13.8 | 10.2 |
| BENDING LOSS (WINDING DIAMETER 20 mm, @ 1550 nm) | dB/m | <0.01 | <0.01 |
| NONLINEAR COEFFICIENT $\gamma$ | $W^{-1}km^{-1}$ | 12.1 | 23.3 |

FIG.28

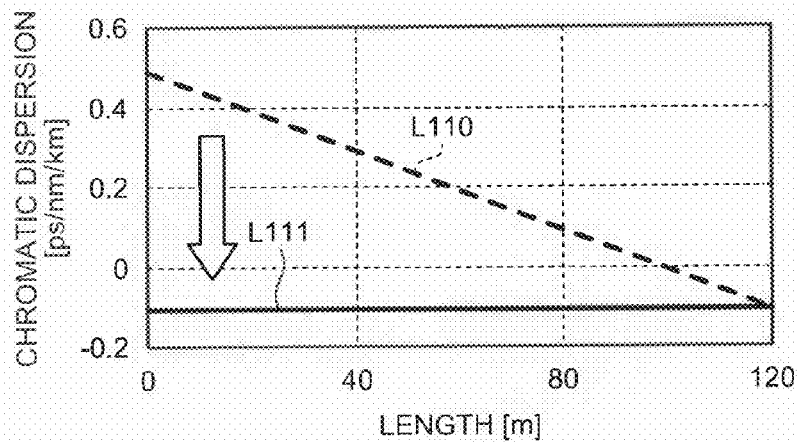

OPTICAL FIBER MODULE AND OPTICAL DEVICE

CROSS-REFERENCE TO RELATED APPLICATIONS

This application is a continuation-in-part of international application no. PCT/JP2007/053956, with an international filing data of Mar. 1, 2007, designating the United States. Priority of the above-mentioned application is claimed and the above-mentioned application is hereby incorporated by reference in its entirely.

BACKGROUND OF THE INVENTION

1. Field of the Invention

The present invention relates to an optical fiber module and an optical device.

2. Description of the Related Art

Optical fibers are used in, for example, optical communication systems for various applications, and various optical characteristics of the optical fibers are required depending on the application.

For example, a highly nonlinear fiber (HNLF) having high nonlinearity has been developed, and accordingly, a signal processing based on nonlinear optical effects that occur in the HNLF is put into practice. The HNLF is used for wavelength conversion based on the four-wave mixing (FWM), the optical pulse compression based on the self-phase modulation (SPM), the optical soliton transmission, the waveform shaping, supercontinuum light sources, and the like. Such HNLFs need to have the most suitable chromatic dispersion for the nonlinear optical effect. For example, in the case of the wavelength conversion based on the FWM, a broadband wavelength conversion can be realized with high efficiency by precisely matching the zero-dispersion wavelength of the HNLF to a predetermined wavelength (see, for example, Japanese Patent Application Laid-open No. 2005-301009).

On the other hand, when a signal light is input to an optical fiber, an acoustic wave in the optical fiber scatters a part of the signal light to generate a scattered light. This scattered light is called the Brillouin-scattered light, which has a peak at an optical frequency lower than that of the signal light by the frequency of the acoustic wave, and which propagates in the backward direction opposite to the direction of transmission of the signal light. The difference between the optical frequency of the signal light and the peak optical frequency is called Brillouin frequency shift (BFS) unique to an individual type of the optical fiber. A monitoring system that detects a failure location in a line of a fiber to the home (FTTH) system by using a plurality of optical fibers designed to have different BFS is disclosed in Nazuki Honda, et al., "Newly developed optical fiber line testing system employing termination cable with individual Brillouin frequency shift", Proceedings of the Society Conference of IEICE, B-10-10, 2005.

When the optical intensity of an incident light exceeds a predetermined threshold, the Brillouin-scattered light causes a stimulated scattering to generate the stimulated Brillouin-scattered (SBS) light. The SBS threshold generally becomes lower as the optical fiber gets longer. When the SBS light is generated, no matter how the optical intensity of the incident light is increased, energy of the incident light is consumed by the SBS light. Therefore, for example, in the case of the wavelength conversion, an increase of the optical intensity of the incident light cannot increase the optical intensity of the light that contributes to generation of the FWM, disadvantageously resulting in low efficiency of the wavelength conversion.

Various methods for increasing the SBS threshold by changing characteristics of an optical fiber, such as the chromatic dispersion and the attenuation loss, in the longitudinal direction of the optical fiber by changing the core diameter or the amount of dopant doped into the core are disclosed in Japanese Patent No. 2584151, Japanese Patent No. 2,753,426, and Japanese Patent No. 3580640. According to the methods, because the BFS changes in the longitudinal direction of the optical fiber, the SBS light is hardly generated, which means that the SBS threshold becomes high.

The optical characteristics of an optical fiber, such as the chromatic dispersion and the BFS, are determined by materials and refractive index profile of the optical fiber.

The optical fiber is generally manufactured by drawing an optical fiber preform to a target cladding diameter (outer diameter) so that the drawn optical fiber has desired optical characteristics. For this reason, most of the optical characteristics are determined when the optical fiber is manufactured. The optical fiber thus manufactured to have the desired optical characteristics is usually incorporated into an optical fiber module or an optical device.

However, the optical characteristics of the manufactured optical fiber show natural fluctuations due to a design error of the target refractive index profile, a fluctuation of the target refractive index profile in the longitudinal direction of the optical fiber, and the like. For this reason, it is hard to obtain an optical fiber module or an optical device having the desired optical characteristics.

SUMMARY OF THE INVENTION

It is an object of the present invention to at least partially solve the problems in the conventional technology.

According to one aspect of the present invention, there is provided an optical fiber module including an optical fiber that propagates a light; and a holding unit that holds the optical fiber in a state in which the optical fiber is stretched in its longitudinal direction to change optical characteristics of the optical fiber.

Moreover, according to another aspect of the present invention, there is provided an optical device including at least one optical fiber module that includes an optical fiber that propagates a light; and a holding unit that holds the optical fiber in a state in which the optical fiber is stretched in its longitudinal direction to change optical characteristics of the optical fiber.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table of characteristics of optical fibers used in Examples and Comparative Examples of the present invention;

FIG. 6 is a graph of relations between stretch ratios of optical fibers in optical fiber modules according to Examples 1, 2, and 3 and chromatic dispersions at 1550 nm;

FIG. 7 is a graph of relations between the stretch ratios of the optical fibers in the optical fiber modules according to Examples 1, 2, and 3 and zero-dispersion wavelengths;

FIG. 27 is a table of characteristics of optical fibers used in Examples and Comparative Examples of the present invention;

FIG. 28 is a graph of a relation between a fiber location in the longitudinal direction in optical fibers in optical fiber modules according to Example 12 and Comparative Example 2 and the chromatic dispersion at 1550 nm;

DETAILED DESCRIPTION OF THE PREFERRED EMBODIMENTS

Exemplary embodiments of the present invention are described in detail below with reference to the accompanying drawings. The present invention is not limited to the embodiments, and various modifications can be made without departing from the scope of the invention.

Given below is an explanation about an optical fiber module according to a first embodiment of the present invention. The optical fiber module includes an optical fiber and a bobbin that applies a stress to the optical fiber by changing the diameter of its barrel around which the optical fiber is wound, to adjust optical characteristics of the optical fiber.

Figure 1:
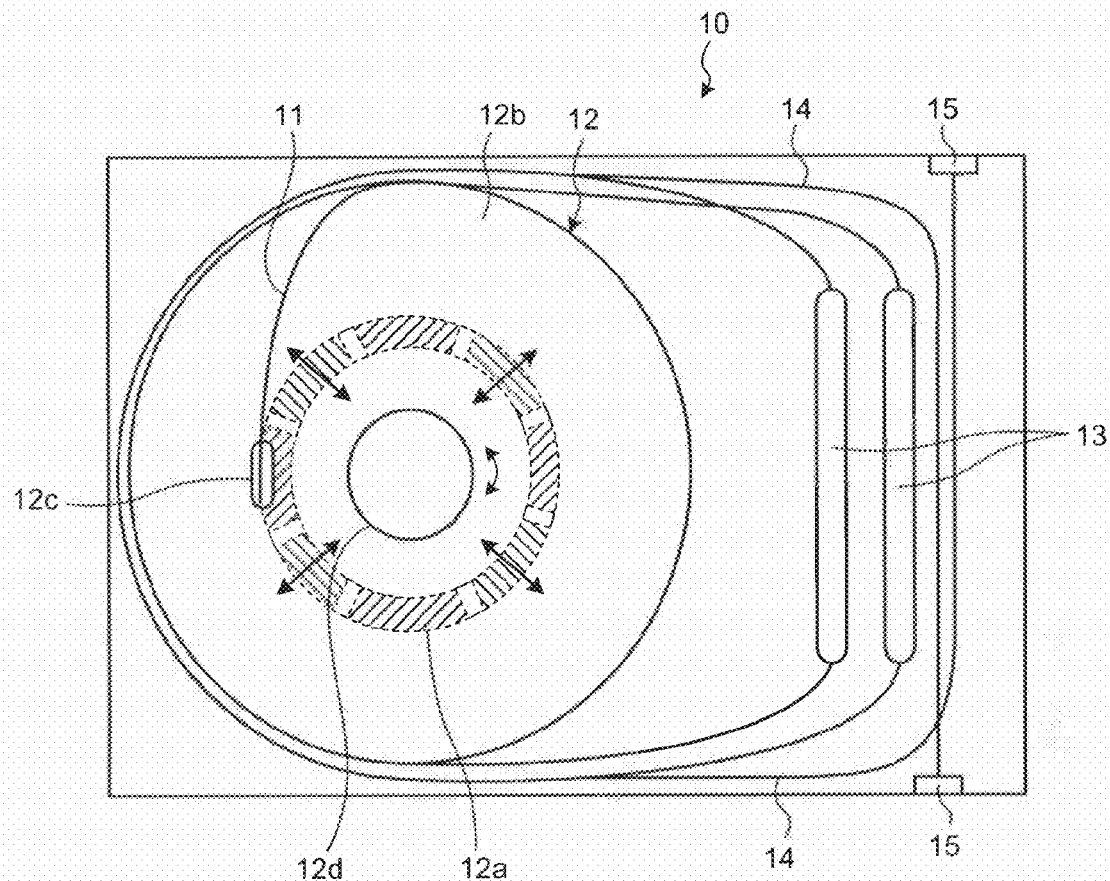
FIG. 1 is a schematic diagram of an optical fiber module according to a first embodiment of the present invention.

FIG. 1 is a schematic diagram of an optical fiber module 10 according to the first embodiment. The optical fiber module 10 includes an optical fiber 11 that includes a core region and a cladding region around the core region, and a bobbin 12 that includes a barrel 12a around which the optical fiber 11 is wound.

Figure 2:
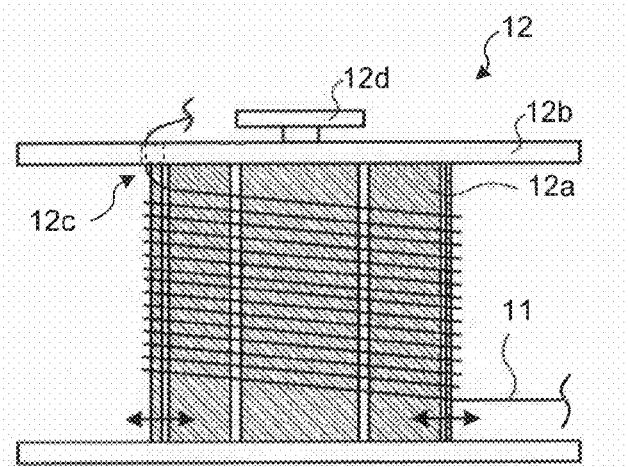
FIG. 2 is a side view of a bobbin shown in FIG. 1.

FIG. 2 is a side view of the bobbin 12. The bobbin 12 further includes a flange 12b, a through hole 12c, and a handle 12d. The optical fiber 11 is wound around the barrel 12a, and an end of the optical fiber 11 is pulled out of the through hole 12c. Both ends of the optical fiber 11 are conducted along the inside of the optical fiber module 10, and are respectively connected to ends of other optical fibers 14 at connectors 13. The other ends of the optical fibers 14 are respectively pulled out of holes 15 to the outside of the optical fiber module 10. The optical fibers 14 are, for example, general single-mode optical fibers.

In the bobbin 12, the barrel 12a is circumferentially segmented into eight segments, which are moved away from or toward the center of the barrel 12a by rotating the handle 12d, as indicated by arrows in FIG. 1. When the segments are moved away from the center, a diameter of the barrel 12a increases, and when the segments are moved toward the center, the diameter decreases.

By changing the diameter of the barrel 12a, a stress is applied to the optical fiber 11 wound around the barrel 12a to change the tension of the optical fiber 11. As a result of changing the tension, length, refractive index, and density of the optical fiber 11 are changed.

For example, the optical fiber 11 with the cladding diameter of 60 μm is wound around the barrel 12a with a winding tension of 1.47 N when the diameter of the barrel 12a is 352.5 mm, and the optical fiber 11 is held in a state of being stretched to a certain degree. When the diameter of the barrel 12a is reduced from 352.5 mm to 350.0 mm, the tension of the optical fiber 11 is relieved, and the length of the optical fiber 11 decreases by about 0.7%. On the contrary, when the diameter of the barrel 12a is increased from 352.5 mm to 355.0 mm, the tension of the optical fiber 11 increases, and the length of the optical fiber 11 increases by about 0.7%. Similarly, if the diameter of the barrel 12a is changed from 350.0 mm to 355.0 mm, the length of the optical fiber 11 changes by about 1.4%.

When the optical fiber 11 is stretched, because the cladding diameter of the optical fiber 11 decreases according to the stretch ratio indicative of the change rate of its length, the core diameter is reduced accordingly. The change rate of the cladding diameter or the core diameter with respect to the stretch ratio is calculated by $$A = 1 - (1 + a/100)^{-0.5} \times 100 (\%) \quad (1)$$

where A is the change rate of the cladding diameter or the core diameter in percentage and a is the stretch ratio of the optical fiber.

When the tension of the optical fiber changes, the core diameter and the refractive index are changed accordingly, and therefore the refractive index profile of the optical fiber is changed. Because the density and the Poisson's ratio of the optical fiber are changed at the same time, the change of the tension results in the change of the optical characteristics. Therefore, the optical characteristics of the optical fiber 11 can be adjusted by changing the diameter of the barrel 12a. Among the optical characteristics, the chromatic dispersion, the cutoff wavelength, and the mode field diameter (MFD) are determined mainly by the refractive index profile of the optical fiber, and therefore these optical characteristics can be adjusted by changing the refractive index profile.

According to the first embodiment, as shown in FIG. 2, the optical fiber 11 is wound around the barrel 12a in a single layer so that the optical fiber 11 is not overlapped with itself. In this manner, the stress is applied evenly to the optical fiber 11 through the whole length, hardly increasing the transmission loss or rupturing the optical fiber 11.

The bobbin 12 can hold the optical fiber 11 in a state in which the optical characteristics are changed by being wound around the barrel 12a with a predetermined tension.

Figure 3:
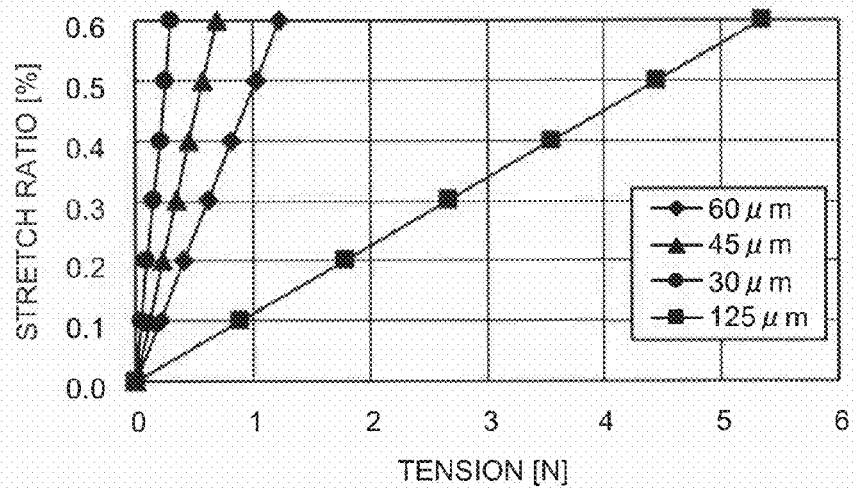
FIG. 3 is a graph of relations between the tension applied to optical fibers made of silica-based glass in a longitudinal direction and stretch ratios of the optical fibers, in which cladding diameters are 30 µm, 45 µm, 60 µm, and 125 µm.

Preferable characteristics of the optical fiber 11 are explained below with reference to a relation with the stress applied to the optical fiber 11. FIG. 3 is a graph of relations between the tension applied to optical fibers made of silica-based glass (silica glass) in the longitudinal direction of the optical fibers, and stretch ratios of the optical fibers. The cladding diameters of the optical fibers are 30 μm, 45 μm, 60 μm, and 125 μm. The tension required to achieve a predetermined stretch ratio is virtually proportional to a square of the cladding diameter. For example, a tension required to achieve the stretch ratio of 0.6% is 5.34 N for the optical fiber with the cladding diameter of 125 μm, while it is 2.50 N for the cladding diameter of 80 μm (not shown) and 1.24 N for the cladding diameter of 60 μm. Furthermore, as described later, because the bending stress applied to the optical fiber with a smaller cladding diameter is smaller compared with the optical fiber with a larger cladding diameter when they are wound around a barrel with the same diameter, the smaller the cladding diameter is, the more reliable the optical fiber is. Therefore, the cladding diameter of the optical fiber 11 is preferably equal to or smaller than 80 μm, and more preferably equal to or smaller than 60 μm.

When a stress is applied to an optical fiber, the modulus of rupture needs to be low enough to achieve a long-term reliability. The modulus of rupture λ of the optical fiber is calculated by $$\lambda = \alpha N_p \frac{B_p / E^2 (\varepsilon^n t)^\beta}{(B/E^2)^\beta \varepsilon_p^{np} t_p} \quad (2)$$

where $n_p$ is fatigue coefficient of the optical fiber in a screening test environment, n is fatigue coefficient of the optical fiber in a use environment, $\varepsilon_p$ is stress applied in the screening test, $\varepsilon$ is stress applied in the use environment, $t_p$ is time for which the stress $\varepsilon_p$ is applied, t is time for which the stress $\varepsilon$ is applied, $N_p$ is number of ruptures per unit length in the screening test, m is modulus of Weibull distribution, α is $m/(n_p - 2)$, β is $(n_p - 2)/(n - 2)$, E is a modulus of elasticity of the optical fiber, B is constant determined by the environment, and $B_p$ is value of B in an atmosphere of the screening test.

When the optical fiber is used as wound around a bobbin, $\varepsilon$ is a sum of the stress of the winding tension and the stress of bending the optical fiber along the barrel of the bobbin. A stress $\varepsilon_w$ caused by the winding tension and a stress $\varepsilon_B$ caused by the bending are calculated $$\varepsilon_w = T/(\pi r E^2) \quad (3)$$

$$\varepsilon_B = d/D \quad (4)$$

where T is the winding tension, r is radius of the cladding region, E is Young's modulus of silica glass ($7.45 \times 10^{10}$ Pa), d is outer diameter of the optical fiber, and D is barrel diameter of the bobbin, i.e., bending diameter.

A stress is calculated using Equations (2), (3), and (4), with which a reliability of the modulus of rupture equal to or less than 0.025% can be assured when an optical fiber with the outer diameter of 60 μm is wound around a bobbin with the barrel diameter of 350 mm and the stress is kept being applied for 20 years. In the actual calculation, $n_p$ is 24, n is 24, $t_p$ is 1 second, t is 6.3×10$^8$ seconds, $N_p$ is 0.01 times/km, m is 1.8, $(B_p/E^2)/(B/E^2)\beta$ is 1000, and $\epsilon_p$ is determined so that the stretch ratio of the optical fiber is 2.0%.

From a result of the calculation, it is found that the reliability of the modulus of rupture is equal to or less than 0.025% when the stress is kept being applied for 20 years can be assured as long as the stress applied to the optical fiber is equal to or smaller than a stress with which the stretch ratio is equal to or less than 0.6%. Therefore, the stress to be applied to the optical fiber 11 is preferably equal to or smaller than a stress required to stretch the optical fiber 11 by 0.6%. Although the modulus of rupture increases as the barrel diameter of the bobbin decreases, the modulus of rupture after applying the stress for 20 years is still equal to or less than 0.025% even when the barrel diameter is about 60 mm, which can assure enough reliability.

Such a high stress that changes the length of the optical fiber can cause an additional transmission loss. Furthermore, when the barrel diameter of the bobbin around which the optical fiber is wound is changed, a lateral pressure is applied to the optical fiber by the bobbin, sometimes causing a high transmission loss. Therefore, when the optical fiber 11 is wound for 16 turns with the bending diameter of 20 mm, a preferable bending loss of the optical fiber 11 at a wavelength of, for example, 1550 nm, is equal to or smaller than 0.01 dB. An optical fiber having such a low bending loss does not cause a loss even when a stress or a lateral pressure is applied. The low bending loss as described above can be realized by using an optical fiber with its MFD equal to or smaller than 6 μm.

As described above, the smaller the cladding diameter is, the less tension is required to achieve the predetermined stretch ratio. However, when the cladding diameter is too small, the optical confinement in the core region is not sufficient, and a light leaks from the optical fiber, which causes a high transmission loss. A cladding diameter required not to cause such a transmission loss varies depending on the design of the core region. In general, however, the higher the relative refractive index difference between the core region and the cladding region becomes, and the smaller the MFD becomes, the smaller the cladding diameter can be. For example, when the MFD is equal to or smaller than 6 μm, a preferable cladding diameter of the optical fiber is equal to or larger than 30 μm.

An example of preferable characteristics of the optical fiber 11 is explained below with reference to a relation with the chromatic dispersion. A preferable dispersion slope of the optical fiber 11 at an operation wavelength, for example 1550 nm, is equal to or smaller than 0.03 ps/nm$^2$/km. In a general single-mode optical fiber, the dispersion slope is about 0.6 ps/nm$^2$/km at 1550 nm, and a zero-dispersion wavelength $\lambda_0$ changes by only 0.5 nm by changing the chromatic dispersion by 0.3 ps/nm/km. However, if the dispersion slope is equal to or smaller than 0.03 ps/nm$^2$/km, the zero-dispersion wavelength $\lambda_0$ changes by 30 nm by changing the chromatic dispersion by 0.3 ps/nm/km, which can adjust the zero-dispersion wavelength $\lambda_0$ in a wider range.

When the nonlinear optical effects in the optical fiber are employed, the nonlinearity preferably increases with an effective area $A_{eff}$ equal to or smaller than 18 μm$^2$ at the operation wavelength. An absolute value of the preferable chromatic dispersion at the operation wavelength is equal to or smaller than 5 ps/nm/km. Furthermore, it is preferable that a cutoff wavelength $\lambda_c$ be smaller than the operation wavelength. For example, when the operation wavelength is 1550 nm, the preferable cutoff wavelength $\lambda_c$ is equal to or shorter than 1500 nm.

The cutoff wavelength herein refers to a fiber cutoff wavelength $\lambda_c$ defined by ITU-T G.650. Other terms and measuring methods described herein also comply with ITU-T G.650, unless otherwise specified.

Figure 4:
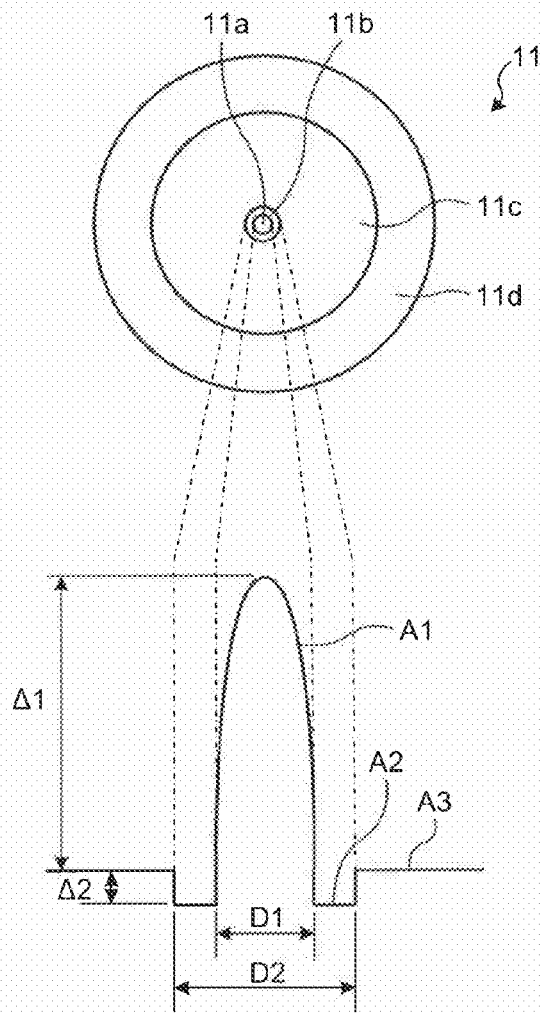
FIG. 4 is a schematic diagram for explaining a relation between a cross-sectional area of the optical fiber shown in FIG. 1 and its refractive index profile.

FIG. 4 is a schematic diagram for explaining a relation between a cross-sectional area of the optical fiber 11 and its refractive index profile.

The optical fiber 11 includes a center core region 11a, a low refractive-index core region 11b, a cladding region 11c, and a coating 11d. The center core region 11a and the low refractive-index core region 11b having a refractive index lower than that of the center core region 11a are collectively called a core region. The cladding region 11c is formed around the low refractive-index core region 11b and its refractive index is higher than that of the low refractive-index core region 11b and lower than that of the center core region 11a. The center core region 11a has a refractive index profile A1, the low refractive-index core region 11b has a refractive index profile A2, and the cladding region 11c has a refractive index profile A3. In other words, the optical fiber 11 has a so-called W-shaped refractive index profile. With such an optical fiber having the W-shaped refractive index profile, the refractive index profile can be easily designed so that the chromatic dispersion changes by about 1 ps/nm/km by changing the diameter of the core region by 1.0%. When the optical fiber is stretched by 0.6%, the core diameter changes by 0.3%, which changes the chromatic dispersion by about 0.3 ps/nm/km.

The ratio D1/D2 of diameter D1 of the center core region 11a to outer diameter D2 of the low refractive-index core region 11b is preferably 0.30 to 0.85 because both the absolute value of the chromatic dispersion at 1550 nm and the dispersion slope at 1550 nm can be small at the same time with this value. More preferably, D1/D2 is 0.3 to 0.7.

A relative refractive index difference Δ1 between the center core region 11a and the low refractive-index core region 11b and a relative refractive index difference Δ2 between the low refractive-index core region 11b and the cladding region 11c are calculated by $$\Delta 1 = \{(n_f - n_0)/n_f\} \times 100 (\%) \quad (5)$$

$$\Delta 2 = \{(n_s - n_0)/n_s\} 100 (\%) \quad (6)$$

where $n_f$ is the highest refractive index in the center core region 11a, $n_s$ is the lowest refractive index in the low refractive-index core region 11b, and $n_0$ is a refractive index of the cladding region 11c.

To make the effective area smaller and achieve higher optical nonlinearity, Δ1 is preferably equal to or more than 1.6%. Furthermore, Δ1 is preferably equal to or less than 3.0%, with which the cutoff wavelength can be easily adjusted to 1500 nm or less, resulting in high productivity. More preferably, Δ1 is 1.8% to 2.9%, which achieves a good balance between the high optical nonlinearity and the high productivity.

On the other hand, to decrease the absolute value of the chromatic dispersion at 1550 nm and easily design a low dispersion slope, Δ2 is preferably equal to or less than −0.2%. Furthermore, Δ2 is preferably equal to or more than −1.2%, which does not require doping a large amount of a dopant, such as fluorine, to reduce the refractive index of the low refractive-index core region 11b, resulting in high productivity. More preferably, $\Delta 2$ is −1.0% to −0.5%, which achieves a good balance between the small dispersion slope and the high productivity.

Although the preferable configuration of the optical fiber to adjust the chromatic dispersion is explained above, it is also possible to adjust the Brillouin frequency shift (BFS) and other optical characteristics that depend on the refractive index profile, using this type of the optical fiber.

An explanation about the coating of the optical fiber is given below. A winding pitch, at which the optical fiber is wound around the bobbin, mainly depends on the outer diameter of the coating. When the outer diameter of the coating is smaller, the optical fiber can be wound at a smaller pitch, and therefore a longer optical fiber can be wound around a bobbin of the same size.

There are two purposes of coating the optical fiber: to prevent degradation of durability due to damages to the surface of the optical fiber, and to prevent degradation of transmission due to strain caused by the stress applied from the outside.

To achieve the former purpose, the coating needs to be thick enough to prevent a physical contact of a foreign object on the surface of the optical fiber. To achieve the latter purpose, the coating is normally double-layered, in which the inner layer has a lower Young's modulus and the outer layer has a higher Young's modulus, so that the stress from the outside is not transferred to the optical fiber by a so-called shell effect. However, with the optical fiber according to the first embodiment, by setting the MFD at the operation wavelength to a value equal to or smaller than 6 μm and setting the bending loss, when winding 16 turns with the diameter of 20 mm, to a value equal to or smaller than 0.01 dB, the optical confinement in the optical fiber is remarkably increased. For this reason, the transmission do not degrade even when the coating is not double-layered, and therefore the coating can be single-layered only for the former purpose. As a result, the coating can be thinner than that of the conventional optical fibers, and the thickness of the coating can be, for example, 30 μm to 40 μm. For example, when the cladding diameter is 30 μm to 60 μm, the coating diameter (outer diameter) of the optical fiber according to the first embodiment can be 70 μm to 100 μm.

As explained above, because the optical fiber module 10 according to the first embodiment changes the barrel diameter of the bobbin 12 to apply the stress to the optical fiber 11 so that the length of the optical fiber is changed to adjust optical characteristics of the optical fiber 11, the optical fiber module 10 realizes the desired optical characteristics even when the optical characteristics of the optical fiber 11 are deviated from the designed values.

As Examples 1, 2, and 3, optical fiber modules as shown in FIG. 1 are manufactured, and the chromatic dispersions are measured in a state of being stretched at various stretch ratios with the barrel diameter of the bobbin changed. FIG. 5 is a table of characteristics of the optical fibers used in Examples and Comparative Examples of the present invention, and the optical fiber modules according to Examples 1, 2, and 3 include fibers A, B, and C shown in FIG. 5, respectively, wound around the barrels in a single layer.

FIG. 6 is a graph of relations between stretch ratios of the optical fibers in optical fiber modules according to Examples 1, 2, and 3 and chromatic dispersions at 1550 nm. FIG. 7 is a graph of relations between the stretch ratios of the optical fibers in the optical fiber modules according to Examples 1, 2, and 3 and zero-dispersion wavelengths. In any one of the optical fiber modules, the chromatic dispersion and the zero-dispersion wavelength $\lambda_0$ can be adjusted to the desired values by changing the stretch ratio of the optical fiber. Furthermore, though the chromatic dispersions of the optical fiber modules can be adjusted within virtually equal ranges, the zero-dispersion wavelength $\lambda_0$ of the optical fiber module according to Example 3 using the fiber C with the smallest chromatic dispersion can be adjusted in a wider range compared with the optical fiber modules according to other Examples.

As Example 4, an optical fiber module as shown in FIG. 1 is manufactured and the BFS is measured in a state of being stretched at various stretch ratios with the barrel diameter of the bobbin changed. The optical fiber module according to Example 4 includes the fiber A wound around the barrel in a single layer. Furthermore, as Comparative Example 1, the BFS is measured in the same optical fiber module as Example 4 at the stretch ratio of the optical fiber being 0%.

Figure 8:
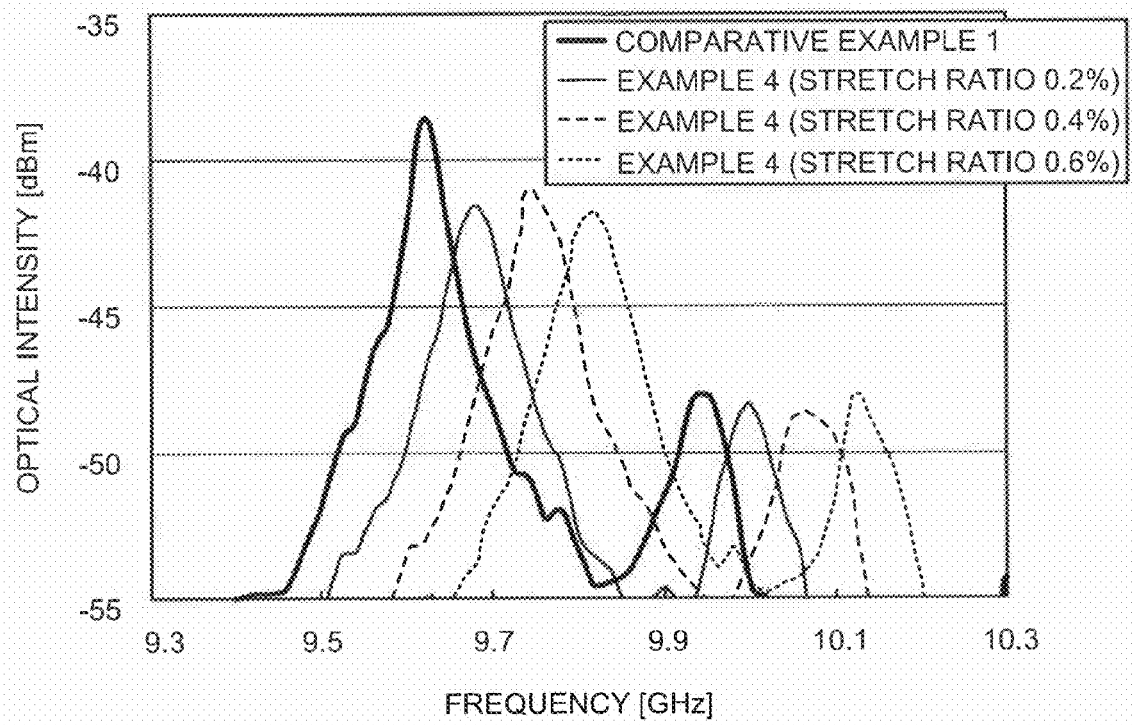
FIG. 8 is a graph of frequency spectra of Brillouin-scattered lights in an optical fiber according to Example 4 with varied stretch ratios and in an optical fiber according to Comparative Example 1.
Figure 9:
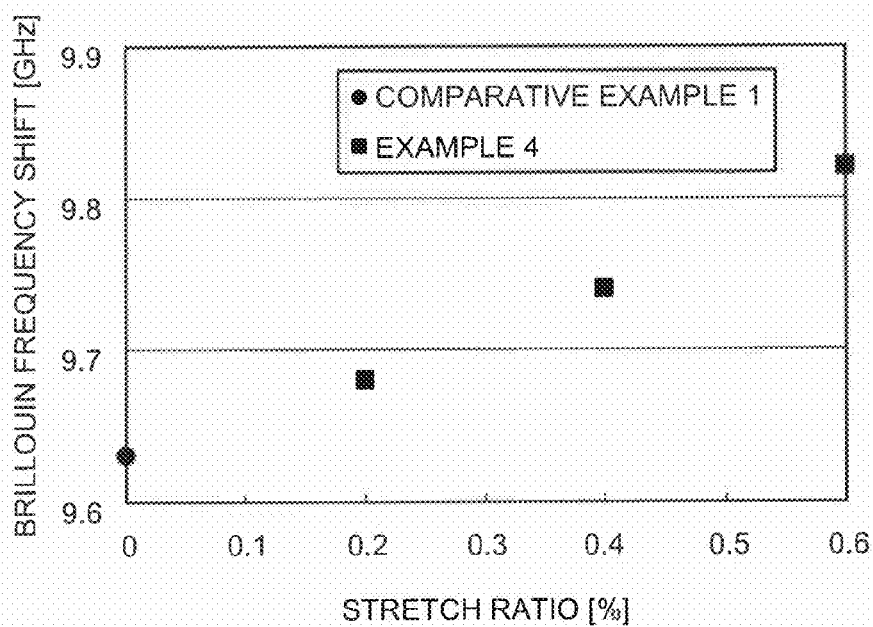
FIG. 9 is a graph of relations between the stretch ratios of the optical fibers according to Example 4 and Comparative example 1 fibers and the BFS.

FIG. 8 is a graph of frequency spectra of the Brillouin-scattered lights in the optical fiber according to Example 4 with its stretch ratio varying from 0.2% to 0.6% and in the optical fiber according to Comparative Example 1. FIG. 9 is a graph of relations between the stretch ratios of the optical fibers according to Example 4 and Comparative example 1 and the BFS. As shown in FIGS. 8 and 9, it is found that the BFS can be adjusted to the desired values by changing the stretch ratio of the optical fiber in the optical fiber module according to Example 4. It is also found that, the higher the stretch ratio of the optical fiber is, the higher the BFS becomes.

Given below is an explanation about an optical fiber module according to a second embodiment of the present invention. The optical fiber module includes an optical fiber and a bobbin that holds the optical fiber wound around its barrel in a state of being stretched to change optical characteristics of the optical fiber.

Figure 10:
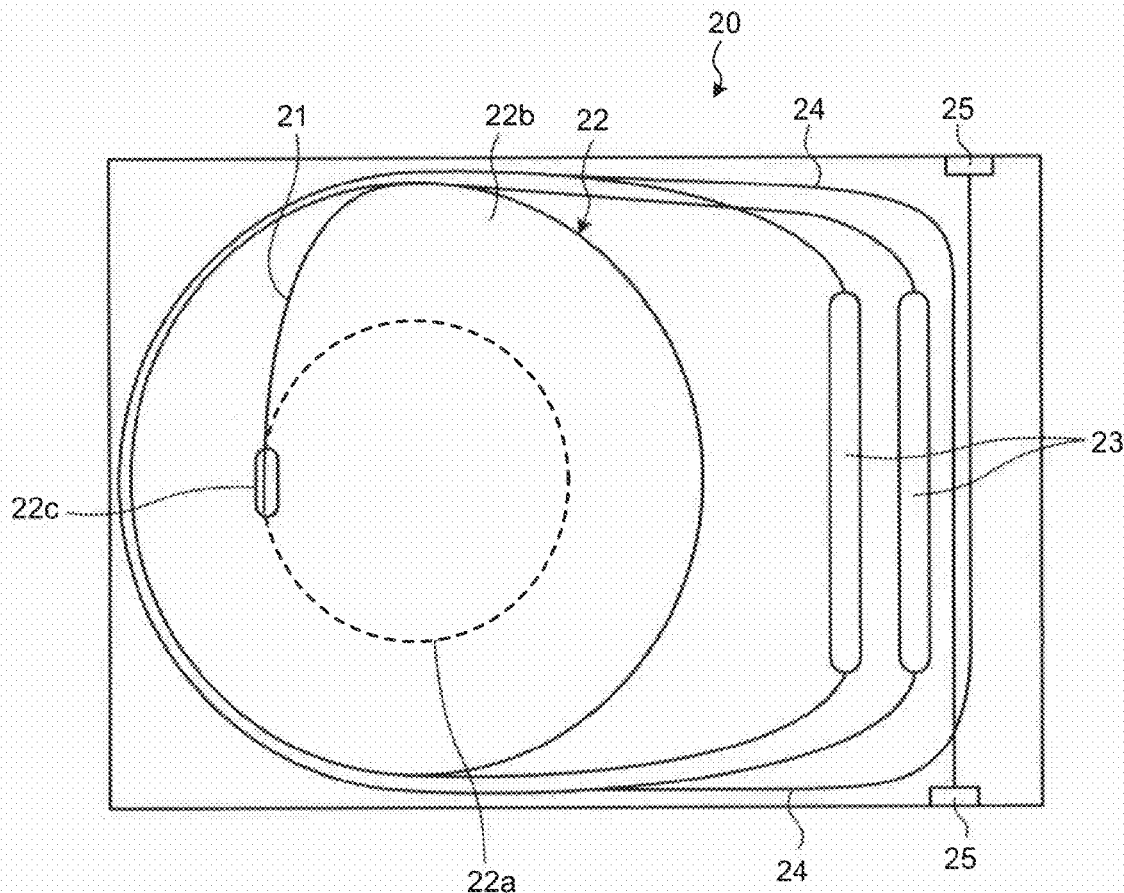
FIG. 10 is a schematic diagram of an optical fiber module according to a second embodiment of the present invention.

FIG. 10 is a schematic diagram of an optical fiber module 20. The optical fiber module 20 includes an optical fiber 21 and a bobbin 22 around which the optical fiber 21 is wound.

Like the bobbin 12 according to the first embodiment, the bobbin 22 includes a barrel 22a, a flange 22b, and a through hole 22c. However, the bobbin 22 does not include a mechanism that changes the diameter of the barrel 22a. The optical fiber 21 is wound around the barrel 22a, and an end of the optical fiber 21 is pulled out of the through hole 22c. Both ends of the optical fiber 21 are conducted along the inside of the optical fiber module 20, and are respectively connected to ends of optical fibers 24 with connectors 23. The other ends of the optical fibers 24 are respectively pulled out of holes 25 to the outside of the optical fiber module 20. The optical fibers 24 are, for example, general single-mode optical fibers.

When the optical fiber 21 is wound around the bobbin 22 with a predetermined tension, the bobbin 22 holds the optical fiber 21 in a state of being stretched to change the optical characteristics of the optical fiber 21 by the same effect as in the first embodiment. Therefore, by winding the optical fiber 21 around the bobbin 22 with the tension that achieves the desired optical characteristics, the optical fiber module 20 realizes the desired optical characteristics even when the optical characteristics of the optical fiber 21 are deviated from the designed values.

As the optical fiber 21, the same type of the optical fiber as the optical fiber 11 according to the first embodiment can be used.

As Examples 5 to 10, optical fiber modules as shown in FIG. 10 are manufactured, and the chromatic dispersions are measured in a state of being held as stretched at predetermined tensions. The optical fiber modules according to Examples 5 to 10 include the fiber A wound around their barrels in a single layer. The tension of the fiber A is about 0.2 N in Example 5, 0.4 N in Example 6, 0.6 N in Example 7, 0.8 N in Example 8, 1.0 N in Example 9, and 1.2 N in Example 10.

Figure 11:
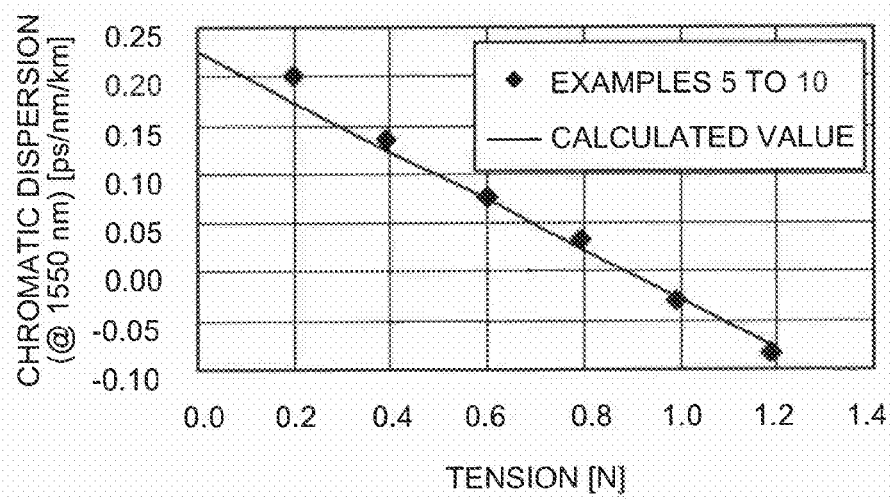
FIG. 11 is a graph of a relation between tension applied to optical fibers in optical fiber modules according to Examples 5 to 10 and chromatic dispersion at 1550 nm.

FIG. 11 is a graph of a relation between tension applied to the optical fibers in the optical fiber modules according to Examples 5 to 10 and chromatic dispersion at 1550 nm. In all of the optical modules, the chromatic dispersions corresponding to the tensions applied to the optical fibers are obtained, which match the values calculated from the refractive index profile of the fiber A in the stretched state. In other words, by holding the optical fiber in a state in which a calculated amount of tension is applied to the optical fiber, the optical fiber modules according to Examples 5 to 10 can adjust the chromatic dispersion to a desired value.

Given below is an explanation about an optical device according to a third embodiment of the present invention. The optical device is a wavelength conversion device that, when a signal light and a pumping light are input, outputs a wavelength-converted light generated by the four-wave mixing (FWM), which is one of the nonlinear optical effects.

Figure 12:
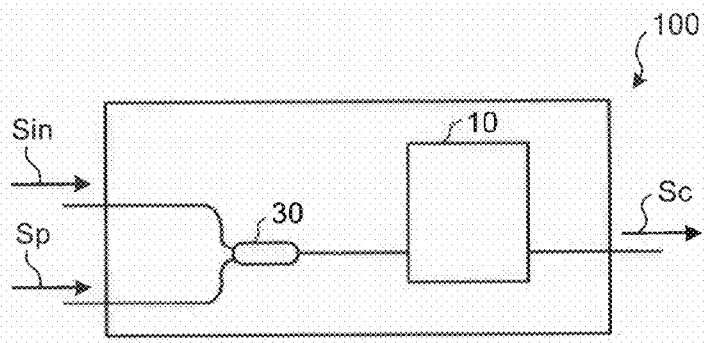
FIG. 12 is a schematic diagram of a wavelength conversion device according to a third embodiment of the present invention.

FIG. 12 is a schematic diagram of a wavelength conversion device 100 according to the third embodiment. The wavelength conversion device 100 includes the optical fiber module 10 according to the first embodiment and an optical coupler 30 that couples a signal light $S_{in}$ with a pumping light $S_p$. The optical coupler 30 outputs a coupled light of the signal light $S_{in}$ and the pumping light $S_p$ to the optical fiber module 10. The optical fiber module 10 generates a wavelength-converted light $S_c$ from the signal light $S_{in}$ by the FWM, and outputs the wavelength-converted light $S_c$ to the outside of the wavelength conversion device 100.

Because the optical fiber module 10 can adjust the zero-dispersion wavelength $\lambda_0$ by changing the length of the optical fiber 11, even when the zero-dispersion wavelength $\lambda_0$ of the manufactured optical fiber 11 is deviated from a pumping light wavelength $\lambda_p$, the wavelength conversion device 100 can precisely match the zero-dispersion wavelength $\lambda_0$ to the wavelength $\lambda_p$, resulting in the wavelength conversion characteristics with high efficiency in a remarkably broad bandwidth. Furthermore, even when the zero-dispersion wavelength $\lambda_0$ of the optical fiber 11 changes according to the change of the ambient temperature of the wavelength conversion device 100, the wavelength conversion device 100 can precisely match the zero-dispersion wavelength $\lambda_0$ to the wavelength $\lambda_p$ again, retaining the desired wavelength conversion characteristics of the wavelength conversion device 100.

As Example 11 of the present invention, a wavelength conversion device is manufactured using the optical fiber module according to Example 2 that includes the fiber B with the zero-dispersion wavelength of 1541.1 nm. The wavelength conversion bandwidth of the wavelength conversion device is measured, while a pumping light at 1550 nm and a signal light with varying wavelengths are input to the wavelength conversion device. During the measurement of the wavelength conversion bandwidth, the zero-dispersion wavelength of the wavelength conversion device is changed by changing the barrel diameter of the bobbin around which the fiber B is wound. The wavelength conversion bandwidth is expressed by a difference between two of the varying wavelengths of the signal light, at which the wavelength conversion efficiency is lower than the peak value by 3 dB in longer and shorter wavelength regions from 1550 nm, which is the pumping light wavelength.

Figure 13:
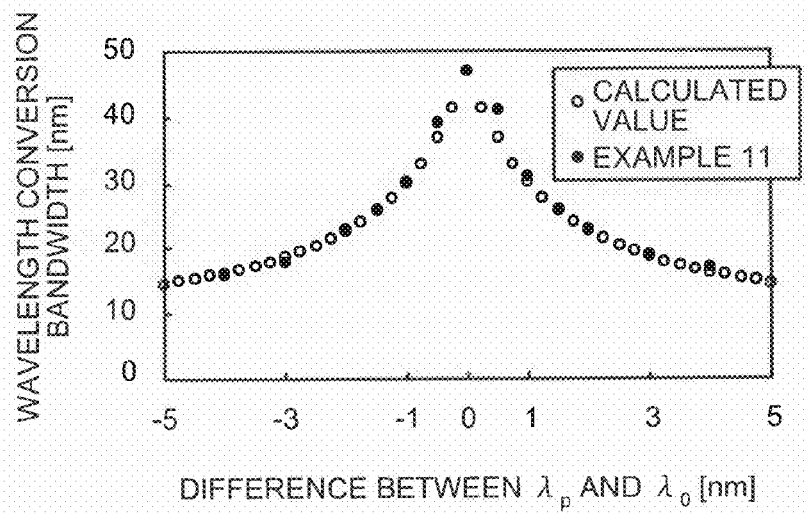
FIG. 13 is a graph of a relation between a difference between wavelength of a pumping light and a zero-dispersion wavelength of a wavelength conversion device according to Example 11 and a wavelength conversion bandwidth.

FIG. 13 is a graph of a relation between a difference between the pumping light wavelength $\lambda_p$ and the zero-dispersion wavelength $\lambda_0$ of the wavelength conversion device according to Example 11, and the wavelength conversion bandwidth. The wavelength conversion bandwidths calculated from the tension applied to the fiber B are also shown in FIG. 13. As shown in FIG. 13, the wavelength conversion bandwidth changes according to the difference between the wavelength $\lambda_p$ and the zero-dispersion wavelength $\lambda_0$, and the wavelength conversion bandwidth is at its maximum when the difference is zero. The tension applied to the fiber B in this state is about 0.24 N. This result indicates that the wavelength conversion device according to Example 11 realizes a broad wavelength-conversion bandwidth by adjusting the zero-dispersion wavelength $\lambda_0$ to match the pumping light wavelength $\lambda_p$.

Given below is an explanation about an optical fiber module according to a fourth embodiment of the present invention. The optical fiber module is used in a monitoring system that detects a failure location in a line of a fiber to the home (FTTH) system based on the BFS.

Figure 14:
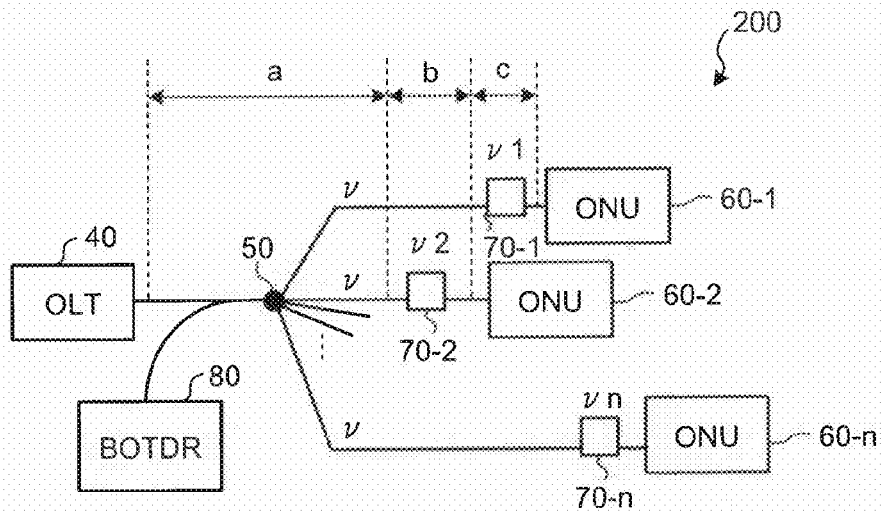
FIG. 14 is a block diagram of a monitoring system that uses an optical fiber module according to a fourth embodiment of the present invention to monitor a fiber to the home (FTTH) system.

FIG. 14 is a block diagram of a monitoring system 200 that uses the optical fiber module according to the fourth embodiment to monitor the FTTH system.

The monitoring system 200 includes an optical line terminal (OLT) 40, an optical splitter 50, optical network units (ONU) 60-1 to 60-n, optical fiber modules 70-1 to 70-n according to the fourth embodiment, and a Brillouin optical time domain reflectometer (BOTDR) 80. The OLT 40 is connected to the ONU 60-1 to 60-n via the optical splitter 50 by optical lines made of optical fibers. The OLT 40 is provided on the terminal side, such as a telephone station, to transmit and receive optical signals. The optical splitter 50 splits a transmission path of the optical signals from the OLT 40 into n branches, where n is an integer equal to or larger than two. The ONU 60-1 to 60-n are provided on the subscriber side to transmit and receive the optical signals. The optical fiber modules 70-1 to 70-$n$ are provided short of the ONU 60-1 to 60-n in the optical lines connecting the optical splitter 50 to the ONU 60-1 to 60-n. The BOTDR 80 measures the Brillouin-scattered light generated in the optical fibers in each block of the optical lines at a predetermined distance from the terminal.

Figure 15:
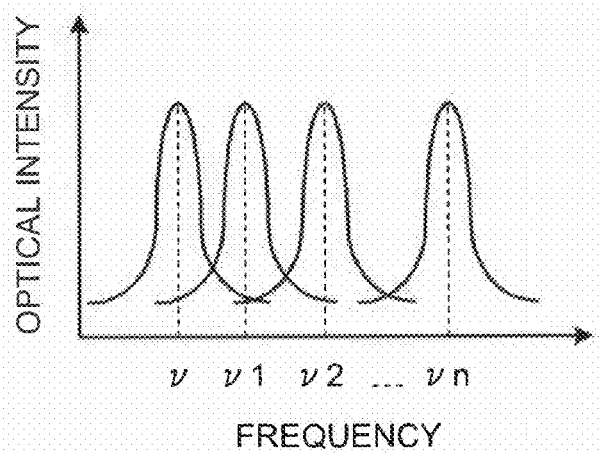
FIG. 15 is a graph of Brillouin scattering spectra in optical fibers and optical fiber modules in the monitoring system shown in FIG. 14.

The BFS in the optical fiber in each optical line is expressed by v. Although the optical fiber modules 70-1 to 70-n include the optical fibers having the same BFS, predetermined amounts of stress are applied to the optical fibers so that the BFS in the optical fibers are adjusted to $v_1$ to $v_n$ different from one another. FIG. 15 is a graph of Brillouin scattering spectra in the optical fibers and the optical fiber modules 70-1 to 70-n included in the monitoring system 200.

When a block a shown in FIG. 14 is monitored by the BOTDR 80, an obtained Brillouin scattering spectrum has its peak at the frequency v. On the other hand, when the block a and a block b that includes the optical fiber module 70-2 are monitored, superposed Brillouin scattering spectra having their peaks at the frequencies v and $v_2$ are obtained. In the same manner, when blocks a, b, and c are monitored, superposed Brillouin scattering spectra having their peaks at the frequencies v, $v_1$, and $v_2$ are obtained. In the case of a failure, such as a disconnection, in the optical lines that connect the optical splitter 50 to the ONU 60-1 to 60-n, a peak of the superposed Brillouin scattering spectra corresponding to the optical fiber module provided in the faulty optical line among the frequencies $v_1$ to $v_n$ is not detected. Therefore, by monitoring the blocks in the optical lines using the BOTDR 80, the faulty optical line can be detected.

The optical fiber modules 70-1 to 70-n include the optical fibers having the same BFS applied with predetermined amounts of stress to change the refractive index, the density, and the Poisson's ratio of the optical fibers, so that the BFS in the optical fibers are adjusted to $v_1$ to $v_n$ different from one another. Therefore, compared with the case of using optical fibers in which the refractive index profiles are designed and manufactured so that the BFS are different from one another, the number of processes of designing and manufacturing the optical fiber can be reduced, without degrading the quality of the monitoring system.

Given below is an explanation about an optical device according to a fifth embodiment of the present invention. The optical device is a wavelength conversion device, as in the third embodiment. However, the optical device according to the fifth embodiment adjusts the chromatic dispersion and the BFS at the same time.

Figure 16:
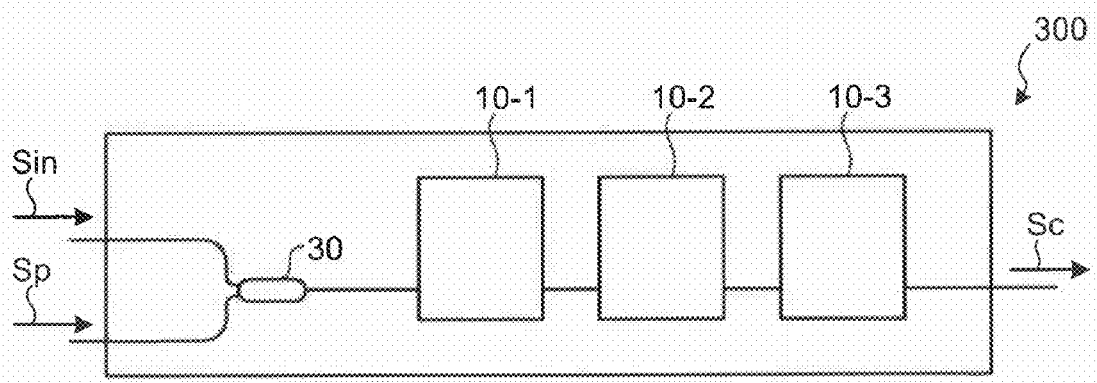
FIG. 16 is a schematic diagram of a wavelength conversion device according to a fifth embodiment of the present invention.

FIG. 16 is a schematic diagram of a wavelength conversion device 300 according to the fifth embodiment. The wavelength conversion device 300 includes optical fiber modules 10-1, 10-2, and 10-3, each having the same configuration as the optical fiber module 10 according to the first embodiment and being connected to one another in a cascading manner, and the optical coupler 30 that couples a signal light $S_{in}$ with a pumping light $S_p$. In the wavelength conversion device 300, like the wavelength conversion device 100 according to the third embodiment, the optical coupler 30 outputs the coupled light of the signal light $S_{in}$ and the pumping light $S_p$ to the optical fiber module 10-1. The optical fiber modules 10-1, 10-2, and 10-3 generate a wavelength-converted light $S_c$ from the coupled light by the FWM, and the optical fiber module 10-3 outputs the wavelength-converted light SC to the outside of the wavelength conversion device 300.

The zero-dispersion wavelength of the optical fiber modules 10-1, 10-2, and 10-3 matches the pumping light wavelength $\lambda_p$, and the BFS of the optical fiber modules 10-1, 10-2, and 10-3 are different from one another. Therefore, the wavelength conversion device 300 has the wavelength conversion characteristics with high efficiency in a remarkably broad bandwidth, and outputs the wavelength-converted light $S_c$ with higher optical intensity. A specific explanation is given below. In the explanation, an optical fiber included in the optical fiber module 10-1 is referred to as an optical fiber 11-1, an optical fiber included in the optical fiber module 10-2 is referred to as an optical fiber 11-2, and an optical fiber included in the optical fiber module 10-3 is referred to as an optical fiber 11-3.

Figure 17:
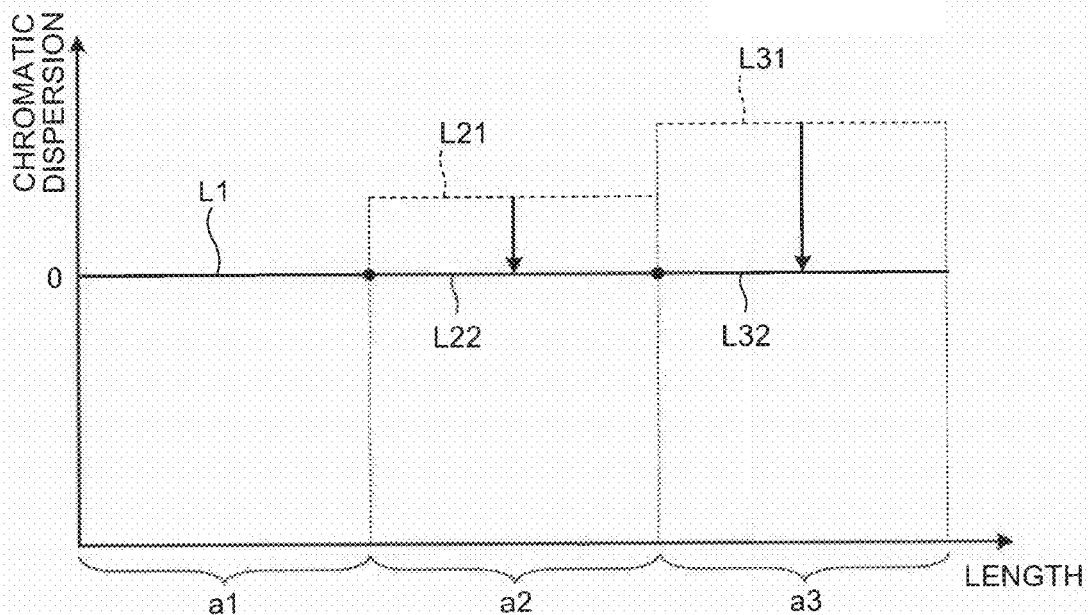
FIG. 17 is a schematic diagram for explaining a relation between a fiber location in the longitudinal direction in the wavelength conversion device shown in FIG. 16 and the chromatic dispersion characteristics.

FIG. 17 is a schematic diagram for explaining a relation between a fiber location in the longitudinal direction in the wavelength conversion device 300 and the chromatic dispersion property. In FIG. 17, the horizontal axis indicates the fiber location in the longitudinal direction of the optical fibers 11-1, 11-2, and 11-3. A block a1 corresponds to the optical fiber 11-1, a block a2 corresponds to the optical fiber 11-2, and a block a3 corresponds to the optical fiber 11-3. The vertical axis indicates the chromatic dispersion at the pumping light wavelength $\lambda_p$.

The chromatic dispersion of the optical fiber 11-1 at the wavelength $\lambda_p$ at the stretch ratio of 0% is 0 ps/nm/km as indicated by a line L1. When the stretch ratio is 0%, the BFS of the optical fiber 11-1 is, for example, 9.63 GHz.

The optical fibers 11-2 and 11-3 are manufactured from the same core preform as the optical fiber 11-1. However, the fiber drawing conditions are controlled so that the optical fibers 11-2 and 11-3 have predetermined positive values indicated by lines L21 and L31 as the chromatic dispersion at the wavelength $\lambda_p$ at the stretch ratio of 0%. The BFS of the optical fibers 11-2 and 11-3 is 9.63 GHz because they use the same core preform as the optical fiber 11-1.

In the optical fiber module 10-1, the optical fiber 11-1 is wound around the bobbin at the stretch ratio of 0%. As a result, the chromatic dispersion of the optical fiber module 10-1 remains 0 ps/nm/km indicated by the line L1, and the BFS also remains 9.63 GHz.

On the other hand, in the optical fiber module 10-2, the optical fiber 11-2 is wound around the bobbin at a predetermined stretch ratio. As a result, the chromatic dispersion of the optical fiber 11-2 shifts from the value indicated by the line L21 to 0 ps/nm/km indicated by the line L22. The BFS also shifts from 9.63 GHz to a higher frequency.

In the optical fiber module 10-3, the optical fiber 11-3 is wound around the bobbin at a predetermined stretch ratio higher than that of the optical fiber 11-2. As a result, the chromatic dispersion of the optical fiber 11-3 shifts from the value indicated by the line L31 to 0 ps/nm/km indicated by the line L32. The BFS also shifts from 9.63 GHz to a frequency even higher than that of the optical fiber 11-2.

As described above, the BFS of the optical fiber modules 10-1, 10-2, and 10-3 are different from one another, and the zero-dispersion wavelength of the optical fiber modules 10-1, 10-2, and 10-3 matches the pumping light wavelength $\lambda_p$.

As a result, compared with a referential optical fiber having the same length as the total length of the optical fibers 11-1, 11-2, and 11-3 and having the same optical characteristics as the optical fiber 11-1, the wavelength conversion device 300 including the optical fiber modules 10-1, 10-2, and 10-3 connected in a cascading manner has a lower peak optical intensity of the Brillouin scattering spectrum, resulting in higher stimulated Brillouin scattering (SBS) threshold. On the other hand, because the zero-dispersion wavelength of the optical fiber modules 10-1, 10-2, and 10-3 matches the pumping light wavelength $\lambda_p$, the wavelength conversion efficiency is not lower than the referential optical fiber.

In other words, the wavelength conversion device 300 outputs the wavelength-converted light $S_c$ with higher optical intensity, because the wavelength conversion device 300 can receive the pumping light $S_p$ with higher optical intensity, retaining the wavelength conversion efficiency. Therefore, like the wavelength conversion device 100 according to the third embodiment, the wavelength conversion device 300 has the wavelength conversion characteristics with high efficiency in a remarkably broad bandwidth, and outputs the wavelength-converted light SC with higher optical intensity.

The wavelength conversion device 300 can be realized, for example, in the following manner. The optical fiber 11-1 is the fiber A having the zero-dispersion wavelength of 1541.7 nm shown in FIG. 5. The optical fiber 11-2 is an optical fiber manufactured from the same core preform as that of the fiber A, in which the chromatic dispersion at 1541.7 nm at the stretch ratio of 0% is adjusted to about 0.16 ps/nm/km by controlling the fiber drawing condition. The optical fiber 11-3 is an optical fiber, in which the chromatic dispersion at 1541.7 nm at the stretch ratio of 0% is adjusted to about 0.32 ps/nm/km. The optical fibers 11-1, 11-2, and 11-3 have the same length.

In the optical fiber module 10-1, the optical fiber 11-1 is wound around the bobbin with such a tension that the stretch ratio is 0%. In this state, the chromatic dispersion of the optical fiber module 10-1 is 0 ps/nm/km at 1541.7 nm. The BFS of the optical fiber module 10-1 is about 9.63 GHz, as indicated by Comparative Example 1 shown in FIG. 8.

In the optical fiber module 10-2, the optical fiber 11-2 is wound around the bobbin with such a tension that the stretch ratio is 0%, and then the barrel diameter is increased to hold the optical fiber 11-2 in a state of being stretched by 0.3%. As a result, the chromatic dispersion of the optical fiber 11-2 shifts to 0 ps/nm/km at 1541.7 nm, and the BFS shifts from about 9.63 GHz to about 9.72 GHz.

In the optical fiber module 10-3, the optical fiber 11-3 is wound around the bobbin with such a tension that the stretch ratio is 0%, and then the barrel diameter is increased to hold the optical fiber 11-3 in a state of being stretched by 0.6%. As a result, the chromatic dispersion of the optical fiber 11-3 shifts to 0 ps/nm/km at 1541.7 nm, and the BFS shifts from about 9.63 GHz to about 9.82 GHz.

Assuming that the pumping light wavelength $\lambda_p$ is 1541.7 nm, the zero-dispersion wavelength of the optical fiber modules 10-1, 10-2, and 10-3 matches the pumping light wavelength $\lambda_p$, and the wavelength conversion device 300 realizes the wavelength conversion characteristics with high efficiency in a remarkably broad bandwidth. Furthermore, the BFS of the optical fiber modules 10-1, 10-2, and 10-3 are about 9.63 GHz, 9.72 GHz, and 9.82 GHz, respectively, which are different from one another, and the FWHM of each Brillouin scattering spectrum is about 0.6 MHz, as shown in FIG. 8. Therefore, difference between each two of the BFS is sufficient, and the SBS threshold is virtually three times higher than that of the fiber A having the same length as the total of the optical fibers 11-1, 11-2, and 11-3.

Given below is an explanation about an optical device according to a sixth embodiment of the present invention. The optical device is a supercontinuum (SC) light source that adjusts the chromatic dispersion and the BFS at the same time, like the wavelength conversion device 300 according to the fifth embodiment.

The SC light source according to the sixth embodiment has the same configuration as the wavelength conversion device 300 according to the fifth embodiment, and the explanation is given using the same reference numerals. More particularly, the SC light source includes the optical fiber modules 10-1, 10-2, and 10-3 connected to one another in a cascading manner. An optical pulse train is input to the optical fiber module 10-1, the optical fiber modules 10-1, 10-2, and 10-3 generate and amplify a SC light, and the optical fiber module 10-3 outputs the SC light.

The chromatic dispersion at the center wavelength of the optical pulse train is negative in all of the optical fibers 11-1, 11-2, and 11-3 included in the optical fiber modules 10-1, 10-2, and 10-3, and the chromatic dispersion decreases in a stepwise manner through the optical fiber modules 10-1, 10-2, and 10-3. Therefore, the SC light source outputs the SC light with little noise in a remarkably broad bandwidth with high efficiency. A specific explanation is given below.

Figure 18:
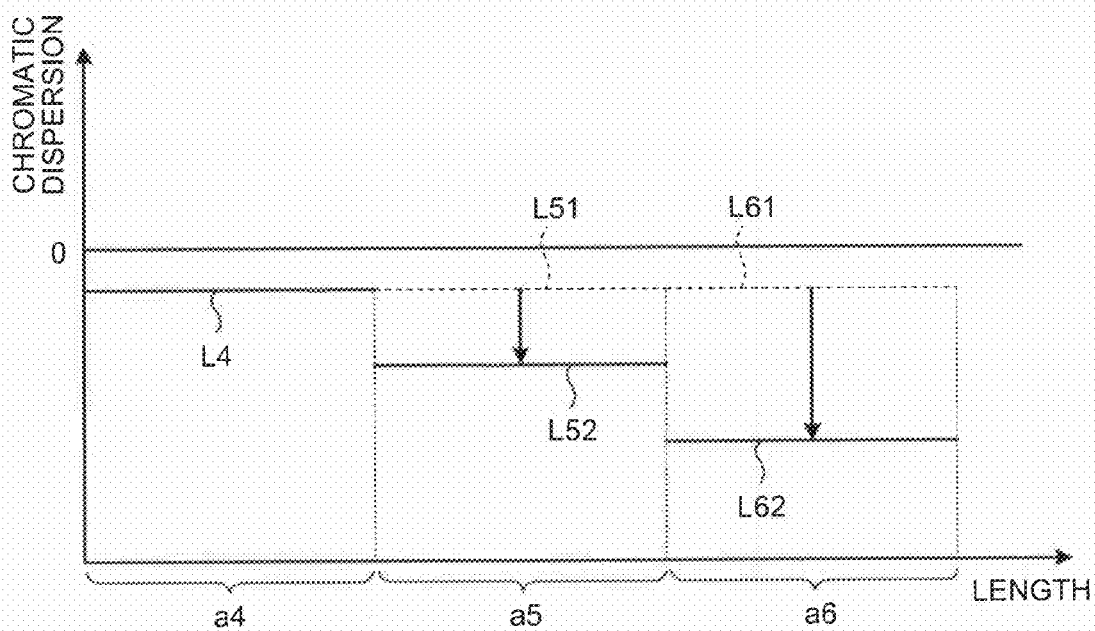
FIG. 18 is a schematic diagram for explaining a relation between a fiber location in the longitudinal direction in a supercontinuum (SC) light source according to a sixth embodiment of the present invention and the chromatic dispersion characteristics.

FIG. 18 is a schematic diagram for explaining a relation between a fiber location in the longitudinal direction in the SC light source and the chromatic dispersion property. In FIG. 18, the horizontal axis indicates the fiber location in the longitudinal direction of the optical fibers 11-1, 11-2, and 11-3. A block a4 corresponds to the optical fiber 11-1, a block a5 corresponds to the optical fiber 11-2, and a block a6 corresponds to the optical fiber 11-3. The vertical axis indicates the chromatic dispersion at the center wavelength of the optical pulse train.

The optical fibers 11-1, 11-2, and 11-3 are the same type of the optical fiber, and, when the stretch ratio is 0%, the chromatic dispersions of the optical fibers 11-1, 11-2, and 11-3 at the center wavelength of the optical pulse train are negative values indicated by lines L4, L51, and L61 shown in FIG. 18, respectively. When the stretch ratio is 0%, the BFS of the optical fibers 11-1, 11-2, and 11-3 is, for example, 9.63 GHz.

In the optical fiber module 10-1, the optical fiber 11-1 is wound around the bobbin at the stretch ratio of 0%. As a result, the chromatic dispersion and the BFS of the optical fiber module 10-1 remain equal to those of the optical fiber 11-1.

On the other hand, in the optical fiber module 10-2, the optical fiber 11-2 is wound around the bobbin at a predetermined stretch ratio. As a result, the chromatic dispersion of the optical fiber 11-2 shifts from the value indicated by the line L51 to a lower value indicated by a line L52. The BFS also shifts from 9.63 GHz to a higher frequency.

In the optical fiber module 10-3, the optical fiber 11-3 is wound around the bobbin at a predetermined stretch ratio higher than that of the optical fiber 11-2. As a result, the chromatic dispersion of the optical fiber 11-3 shifts from the value indicated by the line L61 to a lower value indicated by a line L62. The BFS also shifts from 9.63 GHz to a frequency even higher than that of the optical fiber 11-2.

As a result, the chromatic dispersion at the center wavelength of the optical pulse train is negative in all of the optical fiber modules 10-1, 10-2, and 10-3, and the chromatic dispersion decreases in a stepwise manner through the optical fiber modules 10-1, 10-2, and 10-3. Accordingly, the zero-dispersion wavelength becomes longer in a stepwise manner through the optical fiber modules 10-1, 10-2, and 10-3.

Figure 19:
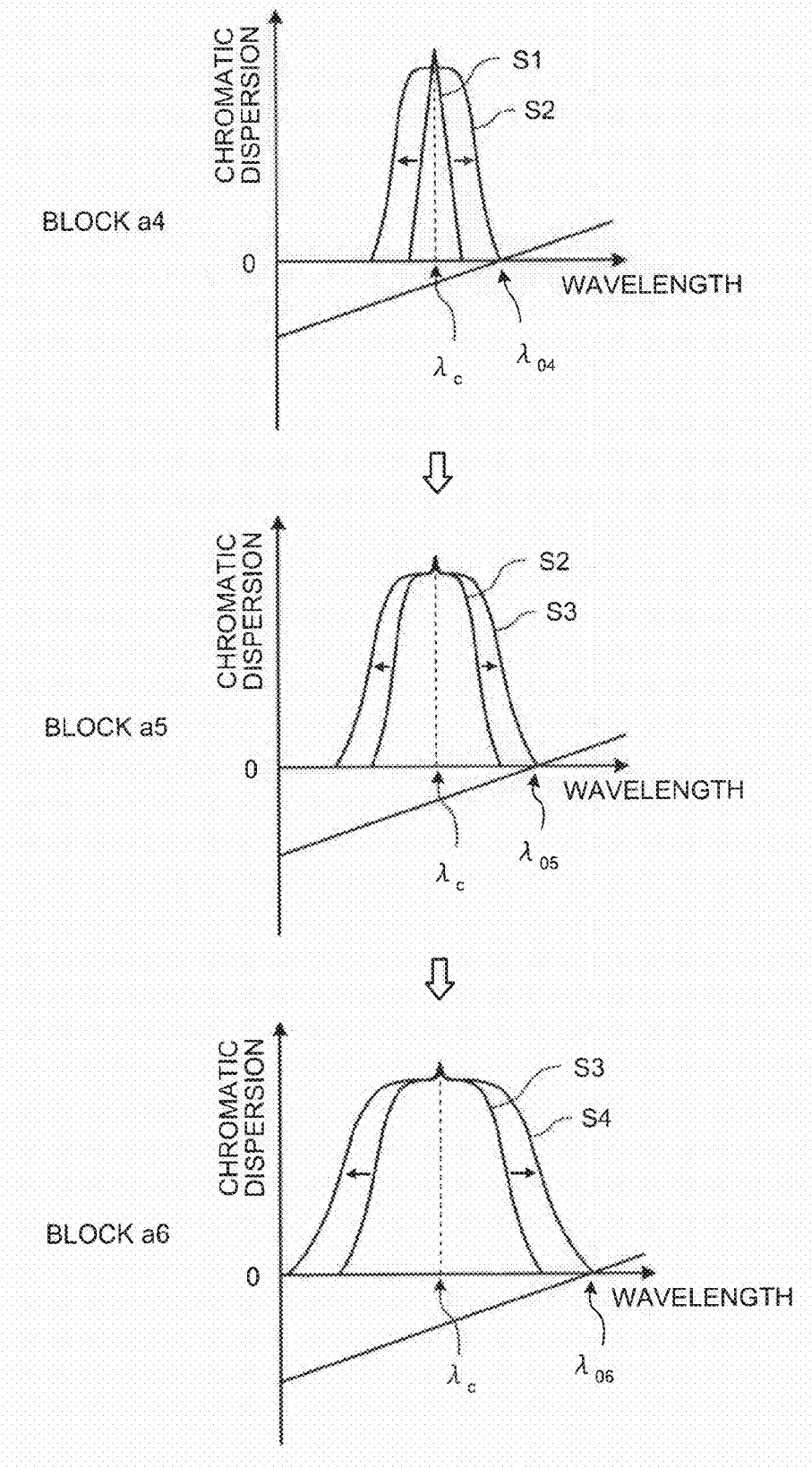
FIG. 19 is a schematic diagram for explaining a mechanism of generating the supercontinuum light in the SC light source.

Given below is an explanation of generation of the SC light in the SC light source. FIG. 19 is a schematic diagram for explaining a mechanism of generating the supercontinuum light in the SC light source. The chromatic dispersions of the optical fiber modules 10-1, 10-2, and 10-3 are assumed to be $\lambda_{04}$, $\lambda_{05}$, and $\lambda_{06}$, respectively.

When an optical pulse train with the center wavelength $\lambda_c$ is input to the optical fiber module 10-1, the spectrum of the optical pulse train at an input end of the block a4 is in a shape as represented by a spectrum S1. However, at an output end of the block a4, the spectrum of the optical pulse train is broadened by the nonlinear optical effects, such as the self-phase modulation, in the optical fiber 11-1, resulting in a spectrum S2. According to the sixth embodiment, because the longest wavelength of the spectrum S2 is tuned not to exceed $\lambda_{04}$ by adjusting the optical nonlinearity and the stretch ratio of the optical fiber 11-1, the spectrum S2 does not cross the zero-dispersion wavelength $\lambda_{04}$, and therefore the FWM light, which can cause a noise in the SC light, is not generated.

When an optical pulse train having the spectrum S2 is input to the optical fiber module 10-2, the spectrum of the optical pulse train at an input end of the block a5 is in the shape as represented by a spectrum S2, and the spectrum is broadened to become a spectrum S3 at an output end of the block a5. As in the optical fiber module 10-1, because the longest wavelength of the spectrum S3 is tuned not to exceed $\lambda_{05}$ by adjusting the optical nonlinearity and the stretch ratio of the optical fiber 11-2, the spectrum S3 does not cross the zero-dispersion wavelength $\lambda_{05}$, and therefore the FWM light is not generated.

When an optical pulse train having the spectrum S3 is input to the optical fiber module 10-3, the spectrum of the optical pulse train at an input end of the block a6 is in the shape as represented by a spectrum S3, and the spectrum is broadened to become a spectrum S4 at an output end of the block a6. As in the optical fiber module 10-1, because the longest wavelength of the spectrum S4 is tuned not to exceed $\lambda_{06}$ by adjusting the optical nonlinearity and the stretch ratio of the optical fiber 11-3, the spectrum S4 does not cross the zero-dispersion wavelength $\lambda_{06}$, and therefore the FWM light is not generated.

As described above, because the FWM light that can cause a noise in the SC light is not generated in any one of the optical fiber modules 10-1, 10-2, and 10-3, the SC light source according to the sixth embodiment can output the SC light with little noise and high efficiency. Furthermore, as in the fifth embodiment, because the BFS of the optical fiber modules 10-1, 10-2, and 10-3 are different from one another, the SC light source can receive an optical pulse train with higher optical intensity, and therefore the SC light source can generate the SC light in broader bandwidth with higher optical intensity.

Figure 20:
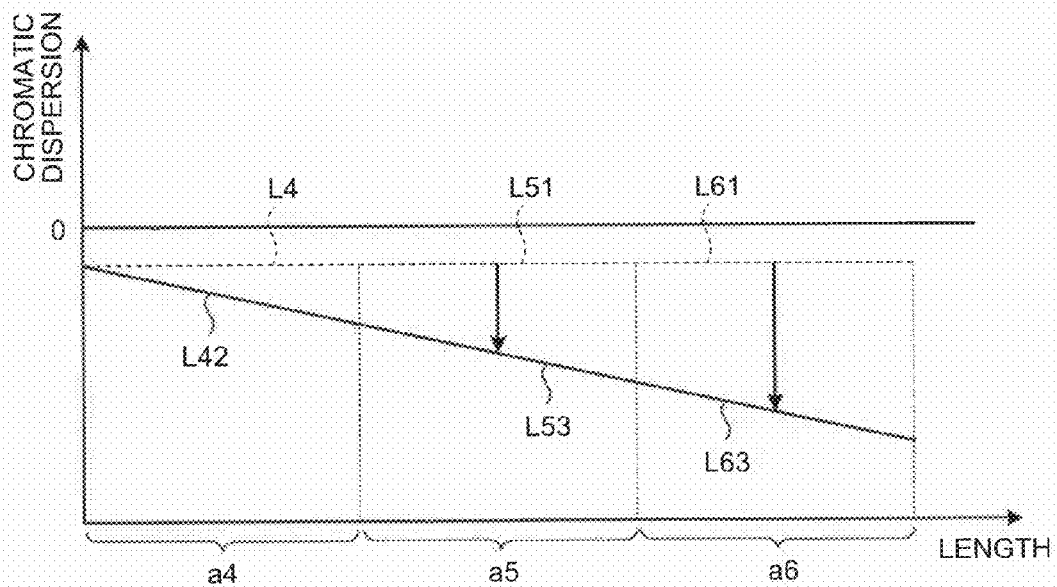
FIG. 20 is a schematic diagram for explaining a relation between a fiber location in the longitudinal direction in a modification of the SC light source according to the sixth embodiment and the chromatic dispersion.

FIG. 20 is a schematic diagram for explaining a relation between a fiber location in the longitudinal direction in a SC light source according to a modification of the sixth embodiment and the chromatic dispersion property. In FIG. 20, the horizontal axis and the vertical axis indicate the same parameters as in FIG. 18. The chromatic dispersions of the optical fibers 11-1, 11-2, and 11-3 at the center wavelength of the optical pulse train are negative values indicated by lines L42, L53, and L63 shown in FIG. 20, respectively, and the chromatic dispersion continuously decreases through the total length of the optical fiber modules 10-1, 10-2, and 10-3. Such a light source can output a SC light in broader bandwidth with higher optical intensity, as in the sixth embodiment. To continuously decrease the chromatic dispersion, for example, the optical fibers 11-1, 11-2, and 11-3 are wound around the optical fiber modules 10-1, 10-2, and 10-3, respectively, with the winding tension continuously changing, and then fixed by a resin or the like.

According to the sixth embodiment and the modification of the sixth embodiment, because the chromatic dispersion at the center wavelength of the optical pulse train is always negative, the SC light source generates a SC light in the normal dispersion region. However, a SC light source in which the chromatic dispersions are adjusted, so that the chromatic dispersion at the center wavelength of the optical pulse train changes from positive to negative at any location in the longitudinal direction of the optical fibers 11-1, 11-2, and 11-3, is also suggested herein as another modification of the sixth embodiment. Such a SC light source can generate a SC light in broader bandwidth with higher optical intensity in the anomalous dispersion region.

Figure 21:
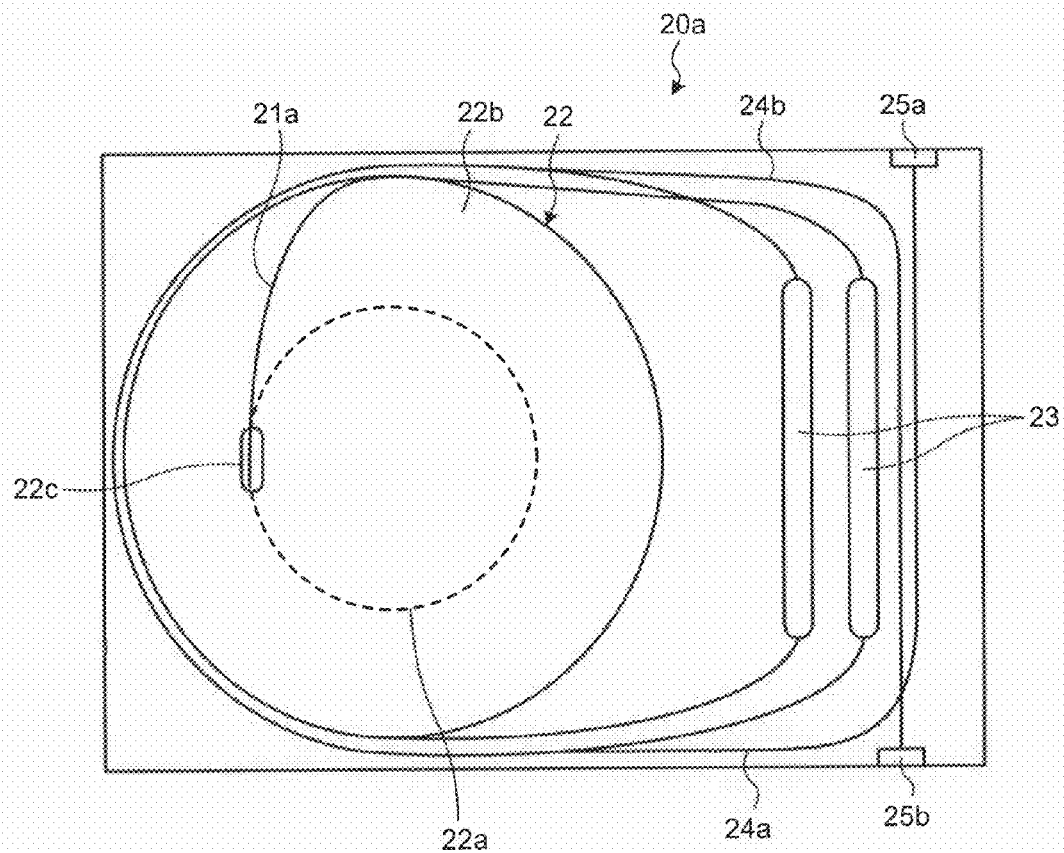
FIG. 21 is a schematic diagram of an optical fiber module according to a seventh embodiment of the present invention.
Figure 22:
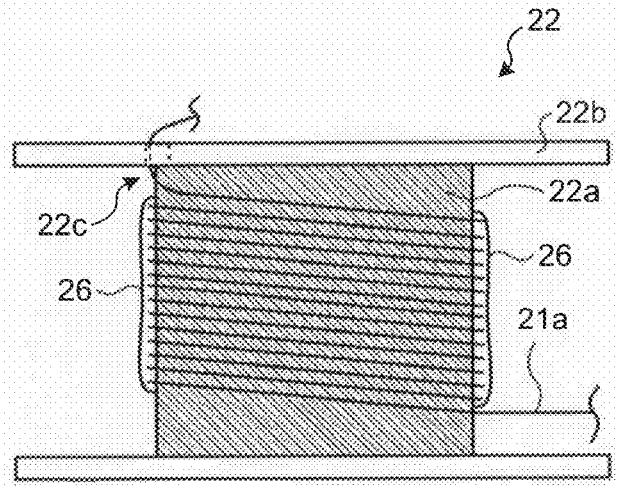
FIG. 22 is a side view of a bobbin shown in FIG. 21.

FIG. 21 is a schematic diagram of an optical fiber module according to a seventh embodiment of the present invention. FIG. 22 is a side view of a bobbin shown in FIG. 21. As shown in FIGS. 21 and 22, an optical fiber module 20a includes an optical fiber 21a formed with a core region and a cladding region around the core region, and the bobbin 22 that includes the barrel 22a around which the optical fiber 21a is wound.

As in the optical fiber module 20 shown in FIG. 10, the bobbin 22 further includes the flange 22b and the through hole 22c. The optical fiber 21a is wound around the barrel 22a, and an end of the optical fiber 21a is pulled out of the through hole 22c. Both ends of the optical fiber 21a are conducted along the inside of the optical fiber module 20a, and are respectively connected to ends of one of optical fibers 24a and 24b with the connectors 23. The other ends of the optical fibers 24a and 24b are respectively pulled out of holes 25a and 25b to the outside of the optical fiber module 20a. The optical fibers 24a and 24b are, for example, general single-mode optical fibers. A light is input to the optical fiber module 20a from the hole 25a, unless otherwise specified.

The optical fiber 21a is wound around the bobbin 22 in a state of being stretched with tensile stress continuously changing in the longitudinal direction, and then fixed to the bobbin 22 by a fixing agent 26 such as resin. The optical fiber 21a is wound around the barrel 22a in a single layer so that the optical fiber 21a is not overlapped with itself. In other words, the bobbin 22 and the fixing agent 26 hold the optical fiber 21a in a state of being stretched with tensile stress continuously changing in the longitudinal direction. Therefore, the optical fiber 21a has the BFS continuously changing in the longitudinal direction, resulting in a remarkably high SFS threshold.

Figure 23:
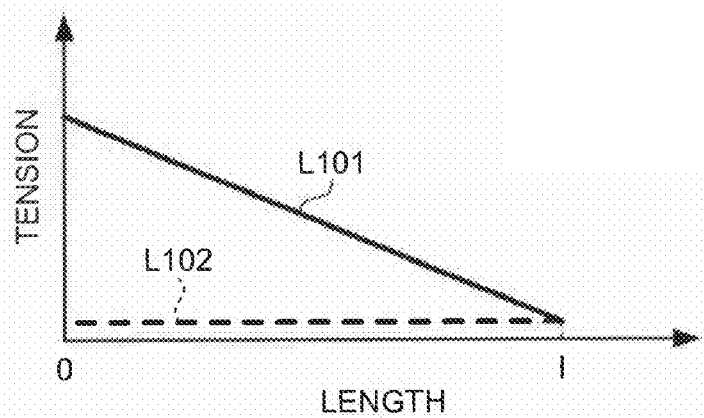
FIG. 23 is a schematic diagram for explaining a relation between a fiber location in the longitudinal direction in an optical fiber wound around the bobbin and the tensile stress.
Figure 24:
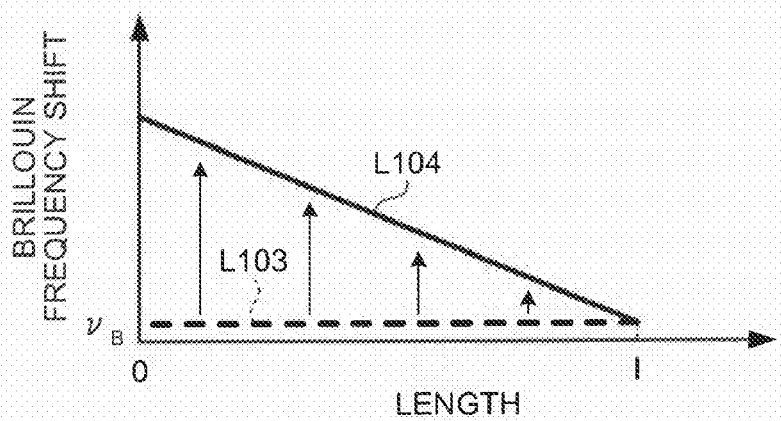
FIG. 24 is a schematic diagram for explaining a relation between a fiber location in the longitudinal direction in an optical fiber in a state shown in FIG. 23 and the BFS.

A specific explanation is given below. FIG. 23 is a schematic diagram for explaining a relation between a fiber location in the longitudinal direction in the optical fiber 21a wound around the bobbin 22 and the tensile stress. FIG. 24 is a schematic diagram for explaining a relation between a fiber location in the longitudinal direction in the optical fiber 21a in a state as shown in FIG. 23 and the BFS. In FIGS. 23 and 24, the length of a portion of the optical fiber 21a stretched around the bobbin 22 is symbolized by "1". The reference point to measure the length of the optical fiber 21a is on the side of the hole 25a. A line L101 indicates the tensile stress applied to the optical fiber 21a, and a line L102 indicates the maximum tensile stress with which the length of the optical fiber 21a is not changed. Lines L103 and L104 indicate BFS corresponding to the tensile stress indicated by the lines L101 and L102, respectively.

As shown in FIG. 23, the tensile stress applied to the optical fiber 21a changes in the longitudinal direction. As a result, the local length, the local refractive index, the local density, and the likes of the optical fiber 21a are changed. When the length of the optical fiber 21a is increased, the cladding diameter of the optical fiber 21a decreases according to the stretch ratio indicative of the change rate of its length, and therefore the core diameter is reduced accordingly. The change rate of the cladding diameter or the core diameter with respect to the stretch ratio is calculated by Equation (1).

By the change of the core diameter and the refractive index, the density of glass in the optical fiber 21a and the Poisson's ratio are changed, and therefore, the frequency of an acoustic wave is also changed. As a result, as shown in FIG. 24, the BFS is also changed in the longitudinal direction. More particularly, as the tensile stress increases, i.e., as the optical fiber 21a is stretched more, the BFS increases from the BFS $v_B$ indicative of the BFS when the optical fiber 21a is not stretched.

Figure 25:
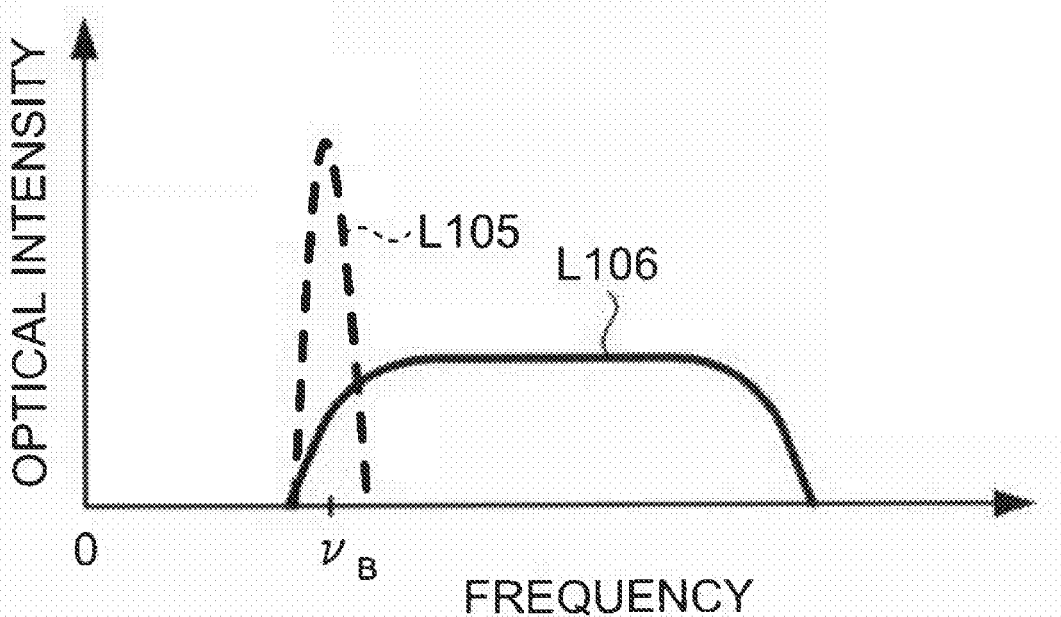
FIG. 25 is a graph of frequency spectra of the Brillouin-scattered lights generated when a light with the same optical intensity enters the optical fibers in the states indicated by lines shown in FIG. 24.

FIG. 25 is a graph of frequency spectra of the Brillouin-scattered lights generated when a light with the same optical intensity enters the optical fiber 21a in the states indicated by the lines L103 and L104 shown in FIG. 24. A line L105 indicates the frequency spectrum in the state indicated by the line L103, and a line L106 indicates the frequency spectrum in the state indicated by the line L104. As shown in FIG. 25, as the BFS changes in the longitudinal direction of the optical fiber 21a, the frequency spectrum also changes its shape from a shape with a narrow bandwidth and high optical intensity centered at $v_B$ as indicated by the line L105 to another shape with a broader bandwidth and lower optical intensity as indicated by the line L106. By this change, the SBS threshold of the optical fiber 21a is increased and the SBS light is suppressed.

Figure 26:
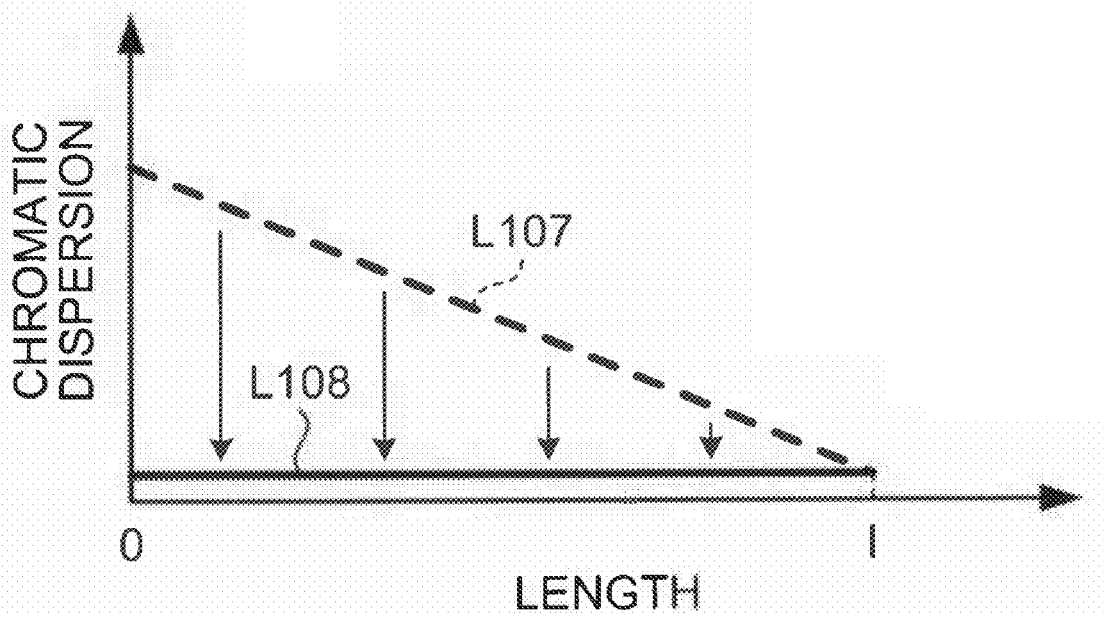
FIG. 26 is a schematic diagram for explaining a relation between a fiber location in the longitudinal direction in the optical fiber in the state shown in FIG. 23 and the chromatic dispersion at an operation wavelength.

Furthermore, in the optical fiber 21a, the core diameter continuously changes in the longitudinal direction when the optical fiber 21a is not stretched. Therefore, the chromatic dispersion of the optical fiber 21a continuously change in the longitudinal direction when the optical fiber 21a is not stretched. On the other hand, when the optical fiber is stretched in the state of being wound around the bobbin 22, the core diameter decreases according to the stretch ratio. Therefore, by winding the optical fiber around the bobbin 22 with changing stretch ratio, the core diameter continuously changes in the longitudinal direction of the optical fiber. By adjusting the stretch ratio to offset the change of the core diameter in the optical fiber 21a, the core diameter of the optical fiber 21a becomes uniform through the whole length in a state in which the continuously changing tension is applied to the optical fiber 21a, resulting in virtually uniform chromatic dispersion through the whole length. FIG. 26 is a schematic diagram for explaining a relation between a fiber location in the longitudinal direction in the optical fiber 21a in the state shown in FIG. 23 and the chromatic dispersion at an operation wavelength. The operation wavelength is equal to the zero-dispersion wavelength of the optical fiber 21a. A line L108 indicates the chromatic dispersion corresponding to the tensile stress indicated by the line L101, and a line L107 indicates the chromatic dispersion corresponding to the tensile stress indicated by the line L102. As described above, the core diameter of the optical fiber 21a and the refractive index change according to the change of the local length in the longitudinal direction. Therefore, as shown in FIG. 26, the chromatic dispersion is also changed in the longitudinal direction from the values indicated by the line L107 to the values indicated by the line L108, resulting in virtually constant chromatic dispersion in the longitudinal direction.

As explained above, because the BFS continuously changes in the longitudinal direction of the optical fiber 21a while the chromatic dispersion is constant in the longitudinal direction, the optical fiber module can effectively suppress generation of the SBS light.

In the case of the optical fiber 21a, because the chromatic dispersion decreases as the core diameter and the cladding diameter decrease from the reference point, the tensile stress is applied to the optical fiber 21a so that the tensile stress decreases accordingly. However, with an optical fiber in which the core diameter and the cladding diameter increase, the tensile stress is applied to the optical fiber so that the tensile stress increases accordingly. In this manner, the chromatic dispersion of the optical fiber are adjusted to be virtually uniform through the whole length.

The optical fiber 21a according to the seventh embodiment has the same configuration and the same refractive index profile as the optical fiber 11 shown in FIG. 4.

As Examples 12 and 13, optical fiber modules as shown in FIG. 21 are manufactured. FIG. 27 is a table of characteristics of optical fibers used in Examples and Comparative Examples of the present invention. The optical fiber module according to Example 12 uses a fiber D, and the optical fiber module according to Example 13 uses a fiber E. In FIG. 27, "CLADDING DIAMETER (INPUT)" indicates the cladding diameter at an input end to which a light is input, and "CLADDING DIAMETER (OUTPUT)" indicates the cladding diameter at an output end from which the light is output. In both the fiber D and the fiber E, the cladding diameter continuously decreases from the input end to the output end. A center core diameter D1 and a low refractive-index core diameter (outer diameter) D2 also change in the longitudinal direction at the same rate as the cladding diameter. Each parameter except the cladding diameter indicates an average of local values through the whole length or an average of local values at the input end and the output end.

In Examples 12 and 13, each of the optical fibers is wound around the bobbin in a single layer. Each of the optical fibers is wound around the bobbin and fixed to it by the fixing agent so that the maximum tensile stress is applied to the input end to stretch the optical fiber by 1.0%, and that the tensile stress continuously decreases in the longitudinal direction.

On the other hand, optical fiber modules are manufactured as Comparative Examples 2 and 3. The optical fiber modules according to Comparative Examples 2 and 3 have the same configuration as the optical fiber modules according to Examples 12 and 13, except that the optical fiber is wound around the bobbin in a single layer with the tensile stress so that the length of the optical fiber does not change, which is only enough to prevent the optical fiber from loosening.

FIG. 28 is a graph of a relation between a fiber location in the longitudinal direction in the optical fibers in the optical fiber modules according to Example 12 and Comparative Example 2 and the chromatic dispersion at 1550 nm. A line L110 indicates the chromatic dispersion of the optical fiber module according to Comparative Example 2, and a line L111 indicates the chromatic dispersion of the optical fiber module according to Example 12. As shown in FIG. 28, the chromatic dispersion of the optical fiber in the optical fiber module according to Comparative Example 2 changes from about 0.5 ps/nm/km to about −0.1 ps/nm/km in the longitudinal direction. On the other hand, the chromatic dispersion of the optical fiber in the optical fiber module according to Example 12 remains virtually constant at about −0.1 ps/nm/km through the whole length. Furthermore, the zero-dispersion wavelength of the optical fiber module according to Example 12 remains constant at about 1559 nm through the whole length.

Figure 29:
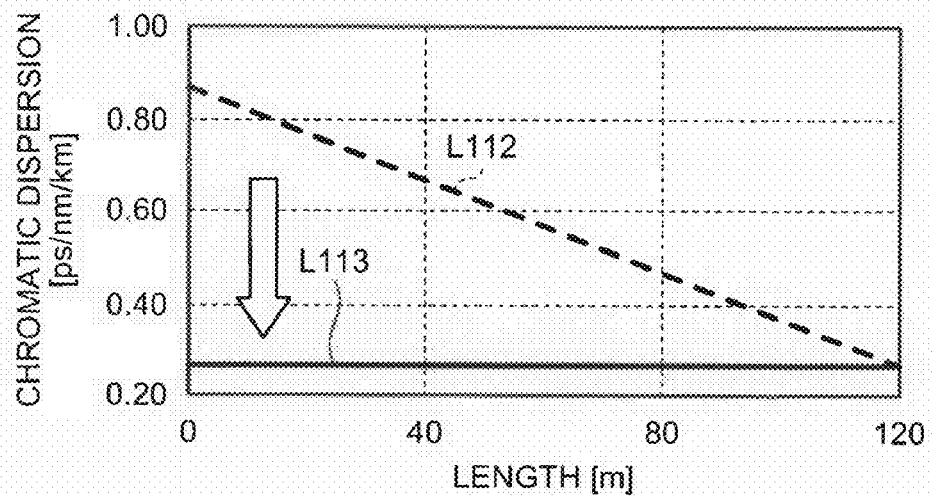
FIG. 29 is a graph of a relation between a fiber location in the longitudinal direction in optical fiber modules according to Example 13 and Comparative Example 3 and the chromatic dispersion at 1550 nm.

FIG. 29 is a graph of a relation between a fiber location in the longitudinal direction in the optical fibers in the optical fiber modules according to Example 13 and Comparative Example 3 and the chromatic dispersion at 1550 nm. A line L112 indicates the chromatic dispersion of the optical fiber module according to Comparative Example 3, and a line L113 indicates the chromatic dispersion of the optical fiber module according to Example 13. As shown in FIG. 29, the chromatic dispersion of the optical fiber in the optical fiber module according to Comparative Example 3 changes from about 0.88 ps/nm/km to about 0.25 ps/nm/km in the longitudinal direction. On the other hand, the chromatic dispersion of the optical fiber in the optical fiber module according to Example 13 remains virtually constant at about 0.25 ps/nm/km through the whole length. Furthermore, the zero-dispersion wavelength of the optical fiber module according to Example 13 remains constant at about 1533 nm through the whole length.

Figure 30:
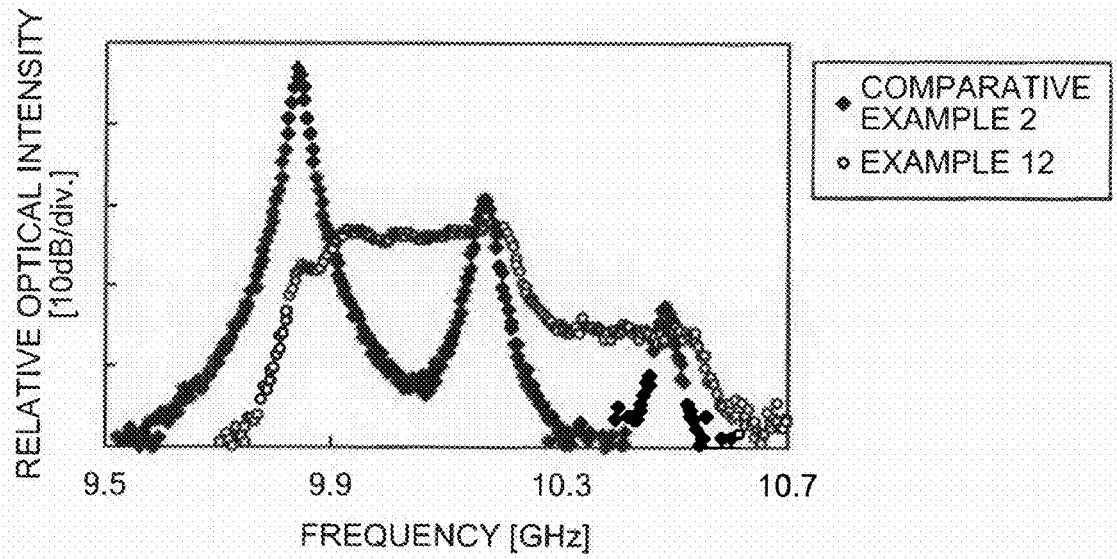
FIG. 30 is a graph of frequency spectra of Brillouin-scattered lights in the optical fiber modules according to Example 12 and Comparative Example 2.

A laser light with the wavelength of 1550 nm and the spectral width of 200 kHz is input to each of the optical fiber modules according to the Examples and Comparative Examples, and the resulting Brillouin-scattered light and the SBS threshold are measured. FIG. 30 is a graph of frequency spectra of the Brillouin-scattered lights in the optical fiber modules according to Example 12 and Comparative Example 2. As shown in FIG. 30, the frequency spectrum of the Brillouin-scattered light in the optical fiber module according to Comparative Example 2 has a plurality of sharp peaks, which indicates the presence of a plurality of BFS. However, the frequency spectrum of the Brillouin-scattered light in the optical fiber module according to Example 12 has a broader bandwidth, and its optical intensity is lower than that in the Comparative Example 2 by nearly 20 dB at the maximum.

Figure 31:
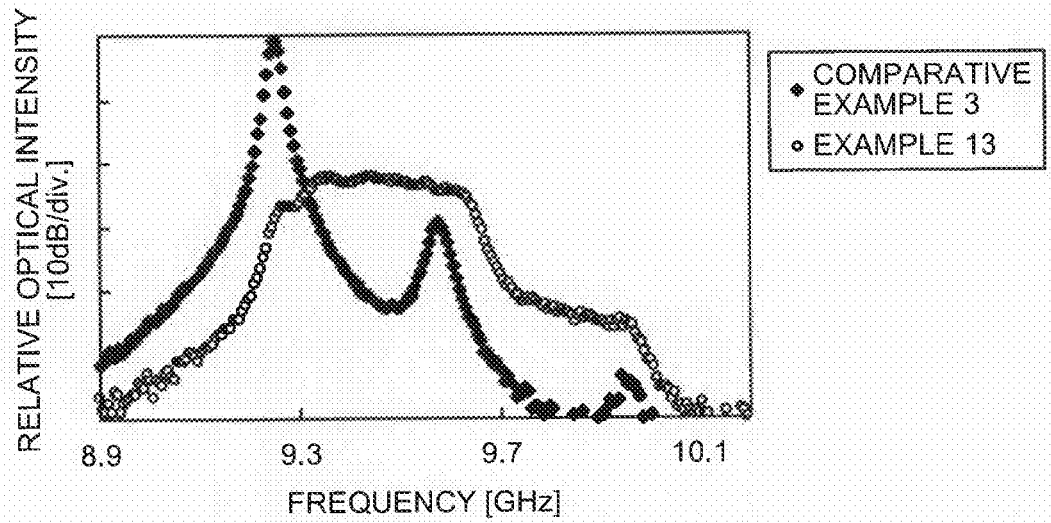
FIG. 31 is a graph of frequency spectra of Brillouin-scattered lights in the optical fiber modules according to Example 13 and Comparative Example 3.

FIG. 31 is a graph of frequency spectra of the Brillouin-scattered lights in the optical fiber modules according to Example 13 and Comparative Example 3. Like Comparative Example 2, the frequency spectrum of the Brillouin-scattered light in the optical fiber module according to Comparative Example 3 has a plurality of sharp peaks, which indicates the presence of a plurality of BFS. However, like Example 12, the frequency spectrum of the Brillouin-scattered light in the optical fiber module according to Example 13 has a broader bandwidth, and its optical intensity is lower than that in the Comparative Example 3 by 20 dB or more at the maximum.

The SBS threshold is 20.8 dBm in the optical fiber module according to Comparative Example 2, and 28.4 dBm in the optical fiber module according to Example 12, which represents an improvement by 7.6 dB using the same type of the optical fiber. On the other hand, the SBS threshold is 18.1 dBm in the optical fiber module according to Comparative Example 3, and 26.7 dBm in the optical fiber module according to Example 13, which represents an improvement by 8.6 dB using the same type of the optical fiber.

The Brillouin-scattered light and the SBS threshold of the optical fiber modules according to Examples 12 and 13 are measured again after the optical fiber modules are left at a normal temperature for six months. As a result, the spectral shape and the SBS threshold are virtually same as those measured six months before, which means that the stress applied to the optical fibers has been retained for six months.

Given below is an explanation about an optical device according to an eighth embodiment of the present invention. The optical device is a wavelength conversion device that, when a signal light and a pumping light are input, outputs a wavelength-converted light generated by the FWM.

Figure 32:
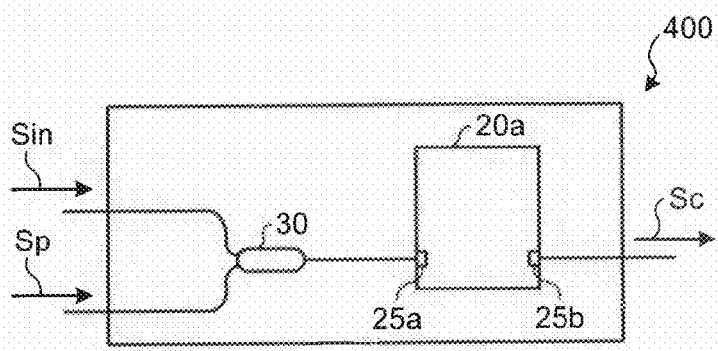
FIG. 32 is a schematic diagram of a wavelength conversion device according to an eighth embodiment of the present invention.

FIG. 32 is a schematic diagram of a wavelength conversion device 400 according to the eighth embodiment. The wavelength conversion device 400 includes the optical fiber module 20a according to the seventh embodiment and the optical coupler 30 shown in FIG. 12. The optical fiber module 20a receives the coupled light of the signal light $S_{in}$ and the pumping light $S_p$ at an input end on the side of the hole 25a, generates the wavelength-converted light SC from the coupled light, and outputs the wavelength-converted light SC from an output end on the side of the hole 25b to the outside of the wavelength conversion device 400.

In the optical fiber module 20a, the chromatic dispersion of the optical fiber is virtually constant through the whole length, and the absolute value of the chromatic dispersion is equal to or smaller than 1 ps/nm/km, and more preferably 0 ps/nm/km, at the pumping light wavelength. Therefore, the wavelength conversion device 400 has the wavelength conversion characteristics with high efficiency in a broad bandwidth.

As Example 14 and Comparative Example 4, a wavelength conversion device including the optical fiber module according to Example 12 and a wavelength conversion device including the optical fiber module according to Comparative Example 2 are manufactured. A signal light with the wavelength of 1564 nm and the optical intensity of 0 dBm is input to each of the optical fiber modules, and a pumping light with the wavelength of 1559 nm, which is equal to the zero-dispersion wavelength of the optical fiber module according to Example 12, is also input with its optical intensity being changed, to measure the conversion efficiency in the wavelength conversion devices. The conversion efficiency is represented by a ratio of the optical intensity of a wavelength-converted light output from a wavelength conversion device to the optical intensity of a signal light input to the wavelength conversion device.

Figure 33:
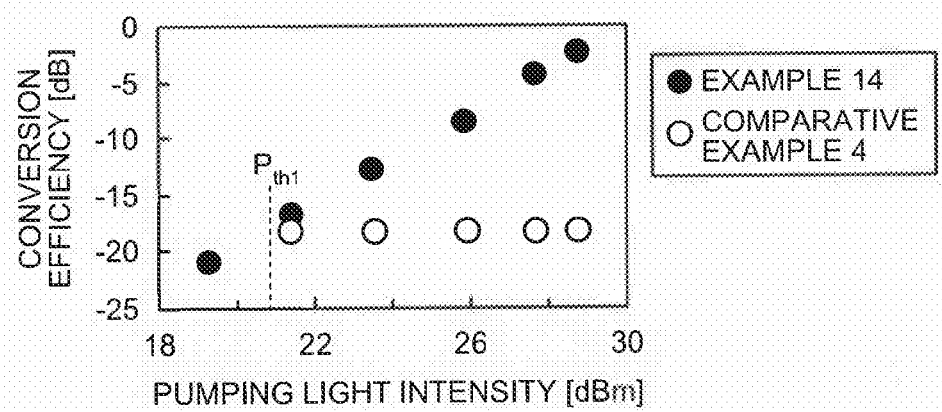
FIG. 33 is a graph of a relation between the optical intensity of a pumping light and the conversion efficiency in wavelength conversion devices according to Example 14 and Comparative Example 4.

FIG. 33 is a graph of a relation between the optical intensity of the pumping light and the conversion efficiency in wavelength conversion devices according to Example 14 and Comparative Example 4. A threshold $P_{th1}$ indicates 20.8 dBm, which is the SBS threshold of the optical fiber module according to Comparative Example 2 used in Comparative Example 4. As shown in FIG. 33, when the optical intensity of the pumping light is about 18.6 dBm, the conversion efficiency of the wavelength conversion devices according to Example 14 and the conversion efficiency of the wavelength conversion devices according to Comparative Example 4 are an equal value of about −21 dB. However, as the optical intensity of the pumping light increases exceeding the threshold Pthl, the conversion efficiency of the wavelength conversion devices according to Comparative Example 4 remains virtually constant at about −20 dB due to the SBS. On the contrary, after the optical intensity of the pumping light exceeds the threshold $P_{th1}$, the conversion efficiency of the wavelength conversion devices according to Example 14 proportionally increases to −2 dB at the maximum, which represents a great improvement by about 18 dB compared with Comparative Example 4.

As Example 15 and Comparative Example 5, a wavelength conversion device including the optical fiber module according to Example 13 and a wavelength conversion device including the optical fiber module according to Comparative Example 3 are manufactured. A signal light with the wavelength of 1564 nm and the optical intensity of 0 dBm is input to each of the optical fiber modules, and a pumping light with the wavelength of 1533 nm, which is equal to the zero-dispersion wavelength of the optical fiber module according to Example 13, is also input with its optical intensity being changed, to measure the conversion efficiency in the wavelength conversion devices.

Figure 34:
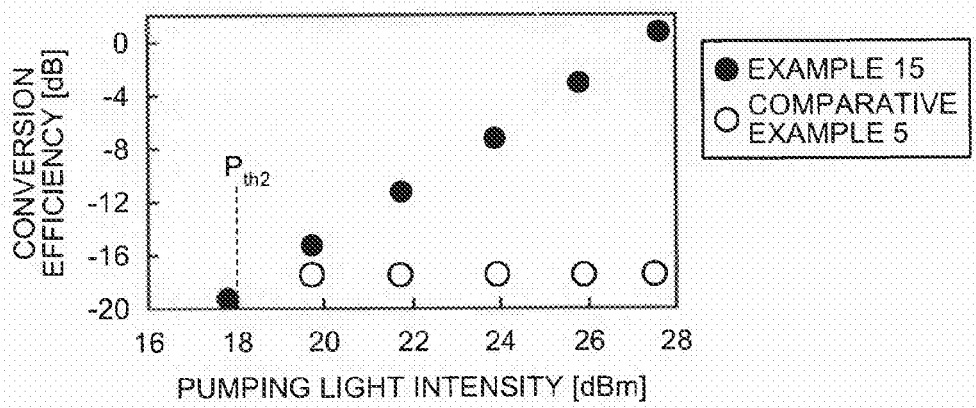
FIG. 34 is a graph of a relation between the optical intensity of a pumping light and the conversion efficiency in wavelength conversion devices according to Example 15 and Comparative Example 5.

FIG. 34 is a graph of a relation between the optical intensity of the pumping light and the conversion efficiency in wavelength conversion devices according to Example 15 and Comparative Example 5. A threshold $P_{th2}$ indicates 18.1 dBm, which is the SBS threshold of the optical fiber module according to Comparative Example 3 used in Comparative Example 5. As shown in FIG. 34, when the optical intensity of the pumping light is about 17.9 dBm, the conversion efficiency of the wavelength conversion devices according to Example 15 and the conversion efficiency of the wavelength conversion devices according to Comparative Example 5 are an equal value of about −19 dB. However, as the optical intensity of the pumping light increases exceeding the threshold $P_{th2}$, the conversion efficiency of the wavelength conversion devices according to Comparative Example 5 remains virtually constant at about −17 dB. On the contrary, after the optical intensity of the pumping light exceeds the threshold $P_{th2}$, the conversion efficiency of the wavelength conversion devices according to Example 15 proportionally increases to 0.7 dB at the maximum, which represents a great improvement by nearly 20 dB compared with Comparative Example 5.

The conversion efficiencies of the wavelength conversion devices according to Examples 14 and 15 are measured again after the wavelength conversion devices are left at a normal temperature for six months. As a result, the conversion efficiencies are virtually same as those measured six months before.

A method of manufacturing the optical fiber module according to the seventh embodiment is explained below. First, an example of a method for winding the optical fiber 21a around the bobbin 22 is explained, in which the optical fiber 21a is stretched by applying tensile stress continuously changing in the longitudinal direction.

Figure 35:
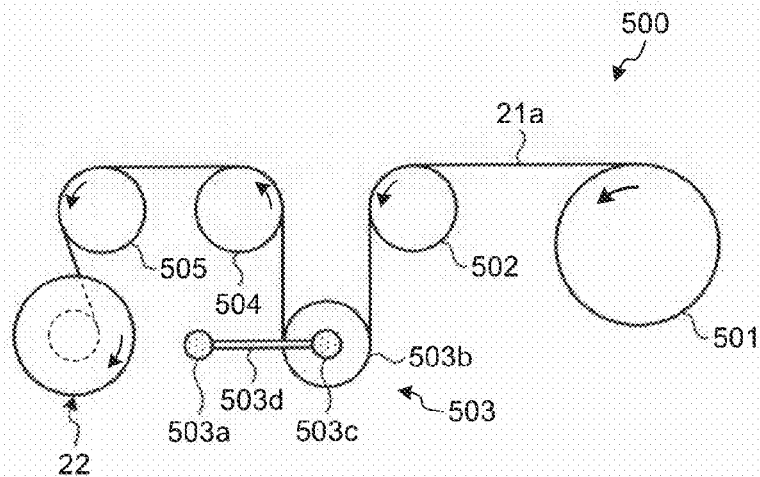
FIG. 35 is a schematic diagram of a winding device that winds an optical fiber around the bobbin shown in FIG. 21.

FIG. 35 is a schematic diagram of a winding device 500 that winds the optical fiber 21a around the bobbin 22 shown in FIG. 21. The winding device 500 includes a bobbin 501, guide rollers 502, 504, and 505, and a tensile-stress applying mechanism 503. The tensile-stress applying mechanism 503 includes a shaft 503a, a dancer roller 503b, a shaft 503c of the dancer roller 503b, and a connecting arm 503d that connects the shaft 503a to the shaft 503c. The shaft 503a is connected to a shaft of a motor (not shown). The dancer roller 503b freely rotates around the shaft 503c, and it is forced by the motor to rotate around the shaft 503a at the same time.

A winding method using the winding device 500 is explained below. First, the optical fiber 21a is pulled out from around the bobbin 501, passes on the surfaces of the guide roller 502, the dancer roller 503b, the guide roller 504, and the guide roller 505, and is finally wound around the bobbin 22.

The bobbin 22 rotates to wind the optical fiber 21a around it. When the motor connected to the shaft 503a is operated by a predetermined rotation torque in this state to rotate in a clockwise direction as viewed on the drawing, such a force is generated that moves the dancer roller 503b in a downward direction via the shaft 503a, the connecting arm 503d, and the shaft 503c. Because the optical fiber 21a is provided around the dancer roller 503b, the force is applied to the optical fiber 21a in the downward direction, instead of rotating the dancer roller 503b in the downward direction. As a result, a predetermined tensile stress is applied to the optical fiber 21a that passes on the surface of the dancer roller 503b, and the optical fiber 21a is wound around the bobbin 22 in the stretched state. By continuously changing the rotation torque of the motor, the optical fiber 21a is wound around the bobbin 22 in a state of being stretched by the tensile stress continuously changing in the longitudinal direction.

After a desired length of the optical fiber 21a is wound around the bobbin 22, the optical fiber 21a is fixed to the bobbin 22 using the fixing agent such as resin. Alternatively, the optical fiber 21a can be fixed using an adhesive tape or the like.

Although the optical fiber 21a is wound around the bobbin 22 in a state of being stretched by the tensile stress continuously changing in the longitudinal direction, the tensile stress can be changed in a stepwise manner in the longitudinal direction. In this case, each step is preferably short enough, i.e., 1/50 to 1/100 of the whole length of the optical fiber 21a. To apply the tensile stress changing in a stepwise manner to the optical fiber 21a, the rotation torque of the motor is changed in a stepwise manner, or, instead of using the motor, a weight can be attached to the dancer roller 503b with the mass of the weight being changed in a stepwise manner.

A method of manufacturing the optical fiber 21a is explained below. As described above, the core diameter and the cladding diameter of the optical fiber 21a continuously change in the longitudinal direction, thereby realizing the chromatic dispersion continuously changing in the longitudinal direction. The optical fiber 21a with such a configuration is obtained by drawing a general optical fiber preform, in which the cladding diameter and the core diameter are uniform through the whole length, so that the cladding diameter continuously changes.

Assume that the cladding diameter of the optical fiber is 70 µm, and that the tensile stress is applied so that the stretch ratio of the optical fiber becomes 1.0% at the maximum. Based on a calculation using Equation (1), when the optical fiber is stretched by 1.0%, the cladding diameter changes by 0.35 µm. Therefore, when the length of the optical fiber for use is 100 m, the fiber drawing should be performed so that the cladding diameter changes by 0.35 µm per 100 m, i.e., so that the change rate is 0.35 µm per 100 m. When the length of the optical fiber for use is 50 m, the fiber drawing should be performed so that the change rate is 0.35 µm per 50 m.

By drawing a general optical fiber preform with a uniform configuration through the whole length so that the cladding diameter periodically changes, a plurality of desired optical fibers used in the optical fiber module according to the present invention can be obtained from a single optical fiber preform.

Figure 36:
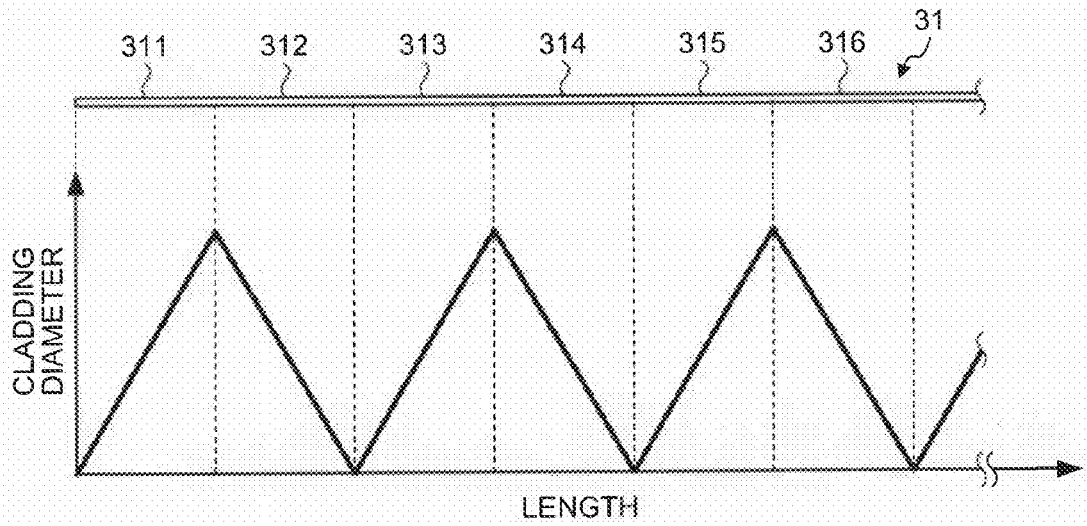
FIG. 36 is a schematic diagram illustrating an example of a change of a cladding diameter (outer diameter) in the longitudinal direction of an optical fiber manufactured by drawing a general optical fiber preform.

FIG. 36 is a schematic diagram for explaining changes of the cladding diameter in a longitudinal direction of an optical fiber 31 manufactured by drawing the general optical fiber preform. The cladding diameter of the optical fiber 31 periodically changes at a predetermined pitch in the longitudinal direction. Therefore, when the optical fiber 31 is cut into optical fibers 311 to 316, each one of the optical fibers 311 to 316 has its cladding diameter increasing or decreasing at the same change rate in the longitudinal direction.

Figure 37:
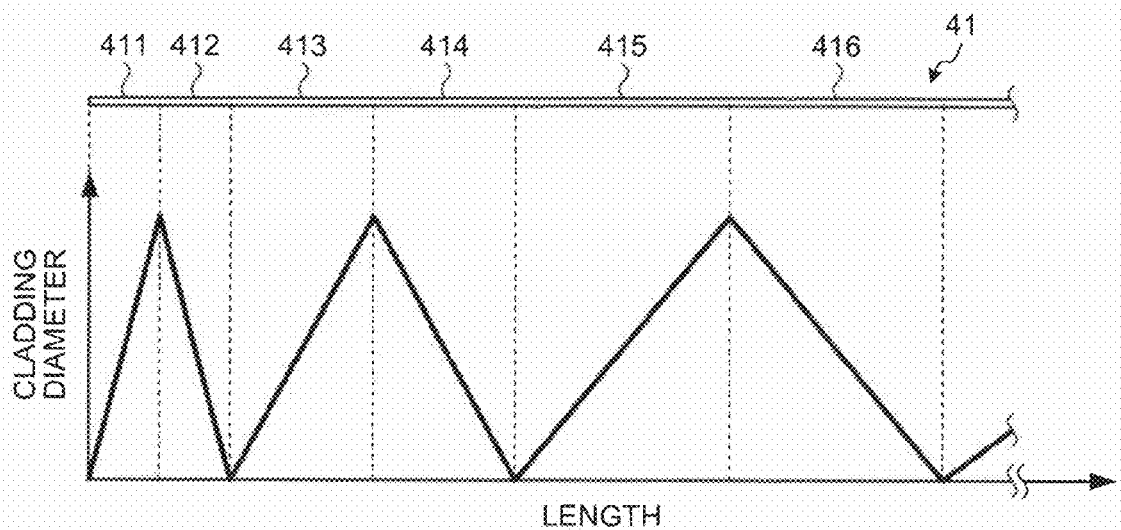
FIG. 37 is a schematic diagram illustrating another example of the change of the cladding diameter in the longitudinal direction of the optical fiber manufactured by drawing a general optical fiber preform.

FIG. 37 is a schematic diagram for explaining changes of the cladding diameter in a longitudinal direction of another optical fiber 41 manufactured by drawing the general optical fiber preform. The cladding diameter of the optical fiber 41 periodically changes at various pitches in the longitudinal direction. Therefore, when the optical fiber 41 is cut into optical fibers 411 to 416, each one of the optical fibers 411 to 416 has its cladding diameter increasing or decreasing at the different change rate in the longitudinal direction. In this manner, the optical fibers 411 to 416 can be obtained with various lengths.

Figure 38:
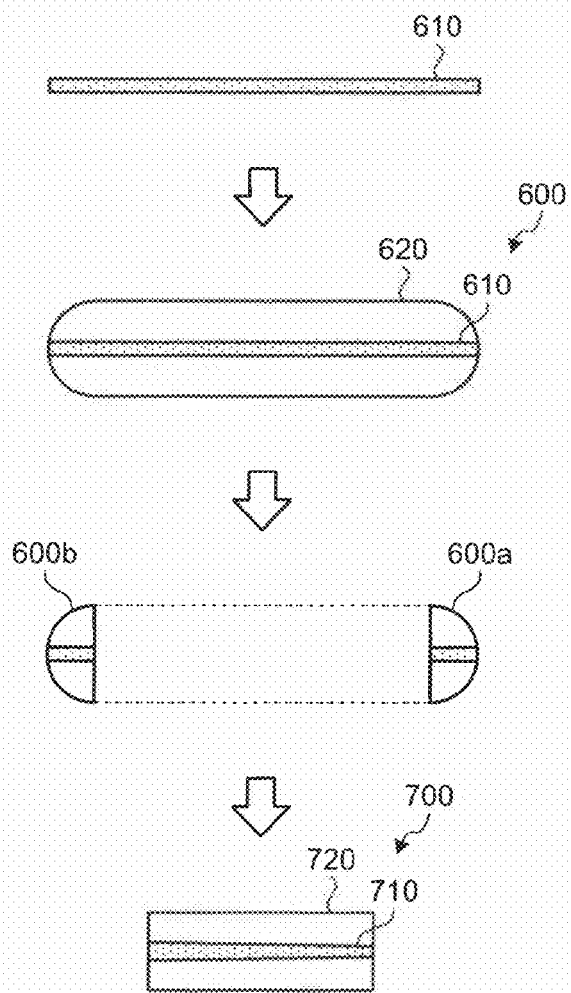
FIG. 38 is a schematic diagram for explaining a method of manufacturing an optical fiber used in the optical fiber module according to the seventh embodiment.

Another method of manufacturing an optical fiber used in the optical fiber module according to the seventh embodiment is explained below. FIG. 38 is a schematic diagram for explaining the method of manufacturing the optical fiber. In this method, a core preform 610 to form a core region is manufactured first. A cladding forming region 620 is then formed around the core preform 610 by the outside vapor deposition (OVD). When the outer diameter of the cladding forming region 620 grows large enough, the core preform 610 with the cladding forming region 620 is drawn, and then the cladding forming region 620 is added again. These steps are repeated to form an optical fiber preform 600 that includes the core preform 610 and the cladding forming region 620. Because it is manufactured by the OVD, the diameter of the cladding forming region 620 is uniform in the longitudinal direction through the middle portion of the optical fiber preform 600. However, the diameter of the cladding forming region 620 decreases at both ends. The both ends with the decreasing diameter are cut off to obtain end preforms 600a and 600b. Either one of the end preforms 600a and 600b is then drawn so that the outer diameter of the cladding forming region 620 becomes uniform through the whole length to form an optical fiber preform 700. In the optical fiber preform 700, though the outer diameter of its cladding forming region 720 is uniform through the whole length, the diameter of its core preform 710 changes in the longitudinal direction.

Figure 39:
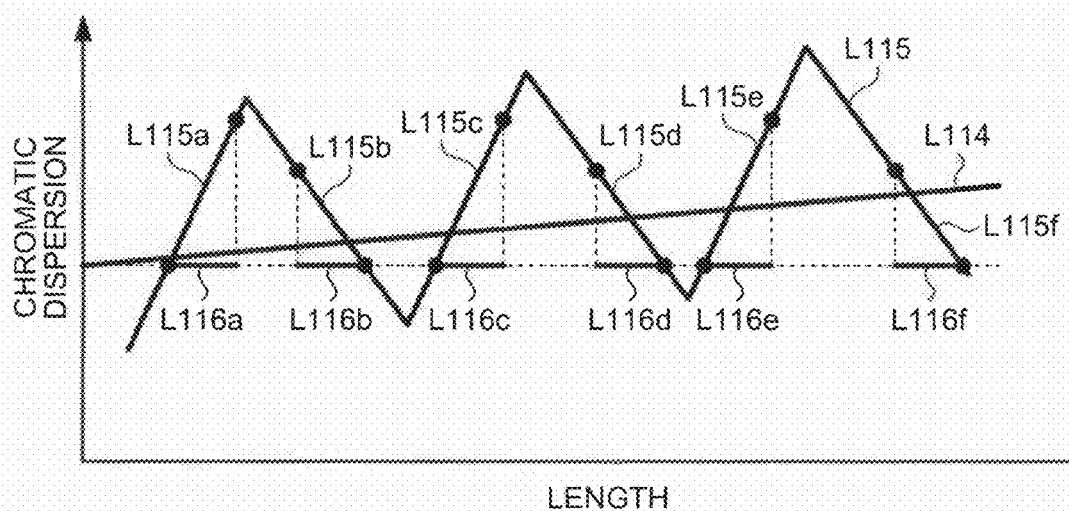
FIG. 39 is a schematic diagram for explaining a relation between a fiber location in the longitudinal direction in the optical fiber manufactured from the optical fiber preform shown in FIG. 38 and the chromatic dispersion.

FIG. 39 is a schematic diagram for explaining a relation between a fiber location in the longitudinal direction of optical fibers manufactured from the optical fiber preform 700 and the chromatic dispersion at an operation wavelength. For example, the chromatic dispersion of an optical fiber drawn from the optical fiber preform 700, so that the cladding diameter is uniform through the whole length, continuously changes in the longitudinal direction, as indicated by a line L114. On the other hand, the chromatic dispersion of an optical fiber drawn from the optical fiber preform 700, so that the cladding diameter periodically changes at a predetermined pitch in the longitudinal direction, periodically changes at the predetermined pitch, as indicated by a line L115. In this optical fiber, the absolute value of the change rate of the chromatic dispersion gradually increases in the longitudinal direction. Therefore, by cutting the optical fiber corresponding to line segments L115a to L115f, optical fibers with various lengths can be obtained. In other words, when a predetermined amount of tensile stress is applied, the optical fibers corresponding to the line segments L115a to L115f represent constant chromatic dispersion through the length indicated by line segments L116a to L116f. In this manner, by drawing the optical fiber preform 700 so that the cladding diameter periodically changes at a predetermined pitch in the longitudinal direction, a plurality of optical fibers with various lengths are manufactured at the same time, and an optical fiber with a desired length can be selected from among them.

In FIG. 38, the outer diameter of the remaining portion of the optical fiber preform 600 after cutting the end preforms 600a and 600b, i.e., the outer diameter of the middle portion of the optical fiber preform 600, is uniform in the longitudinal direction. Therefore, the middle portion of the optical fiber preform 600 can be preferably used to manufacture an optical fiber that has the uniform characteristics through the whole length.

Figure 40:
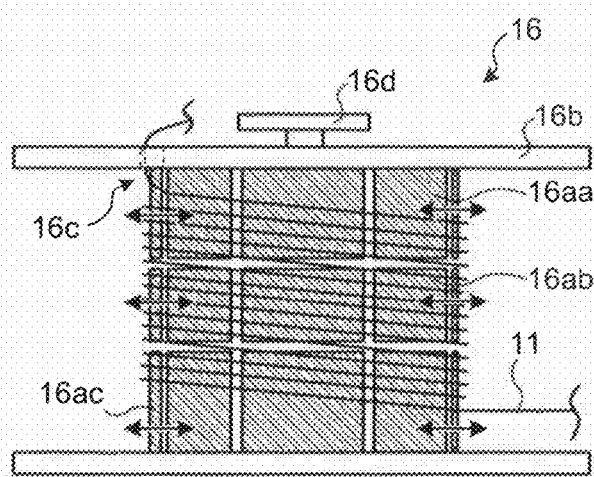
FIG. 40 is a side view of a bobbin according to another embodiment of the present invention.

In the embodiments described above, a bobbin 16 shown in FIG. 40 can be used. FIG. 40 is a side view of the bobbin 16 according to a modification of the present invention. The bobbin 16 has the same configuration as the bobbin 12 shown in FIG. 12, except that the barrel is separated into three stages of barrels 16aa, 16ab, and 16ac, and that the diameters of the barrels 16aa, 16ab, and 16ac are changed in conjunction with one another by rotating a handle 16d. In this manner, the optical fiber module can be made smaller than an optical fiber module that includes three bobbins. Furthermore, the bobbin 16 can be configured to include three handles corresponding to the barrels 16aa, 16ab, and 16ac to change the diameters of the barrels 16aa, 16ab, and 16ac independently.

In the optical fiber module according to the embodiments, the bobbin is used as a holding unit that holds the optical fiber in a stretched state, and the stress applying mechanism applies a stress to the optical fiber by changing the barrel diameter of the bobbin to change the length of the optical fiber. However, the holding unit can be configured as a unit that includes a fixture that fixes both ends of the optical fiber to hold the optical fiber in the stretched state. Furthermore, the stress applying mechanism can be configured as a fixture moving mechanism that moves the fixture to change the length of the optical fiber.

As described above, according to one aspect of the present invention, the optical fiber module and the optical device can be advantageously used in an optical fiber communication system and a monitoring system for the FTTH system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber module comprising:
    an optical fiber that transmits a light, the optical fiber including
        a first core region formed at a center of the optical fiber,
        a second core region formed around the first core region and having a refractive index lower than a refractive index of the first core region, and
        a cladding region formed around the second core region and having a refractive index higher than the refractive index of the second core region and lower than the refractive index of the first core region,
        a ratio of diameter of the first core region to outer diameter of the second core region from 0.3 to 0.85,
        a relative refractive index difference between the first core region and the second core region from 1.6% to 3.0%, and
        a relative refractive index difference between the second core region and the cladding region from −1.2% to −0.2%; and
    a holding unit that holds the optical fiber in a state in which the optical fiber is stretched in its longitudinal direction to change optical characteristics of the optical fiber.

2. The optical fiber module according to claim 1, wherein the holding unit includes a stress applying member that applies a stress to the optical fiber such that the optical fiber is stretched in the longitudinal direction.

3. The optical fiber module according to claim 1, wherein the holding unit is a bobbin that includes a barrel around which the optical fiber is wound.

4. The optical fiber module according to claim 2, wherein the holding unit is a bobbin that includes a barrel around which the optical fiber is wound.

5. The optical fiber module according to claim 2, wherein the stress applying member is a barrel-diameter variable mechanism that changes a diameter of a barrel of a bobbin around which the optical fiber is wound.

6. The optical fiber module according to claim 3, wherein the optical fiber is wound around the bobbin in a single layer.

7. The optical fiber module according to claim 4, wherein the optical fiber is wound around the bobbin in a single layer.

8. The optical fiber module according to claim 1, wherein
    the optical fiber is formed of a silica glass, and
    an outer diameter of the cladding region is 30 micrometers to 60 micrometers.

9. The optical fiber module according to claim 8, wherein the optical fiber further includes a coating formed around the cladding region, and an outer diameter of the coating is 70 micrometers to 100 micrometers.

10. The optical fiber module according to claim 8, wherein the stress applied to the optical fiber is equal to or smaller than a stress required to stretch the optical fiber by 0.6% in the longitudinal direction.

11. The optical fiber module according to claim 1, wherein the optical fiber has a bending loss equal to or smaller than 0.01 decibel at a wavelength of 1550 nanometers when the optical fiber is wound for 16 turns with a bending diameter of 20 millimeters.

12. The optical fiber module according to claim 1, wherein the optical characteristics include chromatic dispersion.

13. The optical fiber module according to claim 12, wherein a dispersion slope of the optical fiber at a wavelength of 1550 nanometers is equal to or smaller than 0.03 ps/nm$^2$/km.

14. The optical fiber module according to claim 1, wherein the optical characteristics include Brillouin frequency shift of a Brillouin-scattered light.

15. The optical fiber module according to claim 1, wherein
    the optical fiber has chromatic dispersion varying in the longitudinal direction, and
    the holding unit holds the optical fiber in a state in which a stress that varies in the longitudinal direction to counterbalance a variation of the chromatic dispersion is applied to the optical fiber so that the chromatic dispersion become virtually uniform through a whole length of the optical fiber.

16. An optical device comprising at least one optical fiber module including:
    an optical fiber that propagates a light, the optical fiber including
        a first core region formed at a center of the optical fiber,
        a second core region formed around the first core region and having a refractive index lower than a refractive index of the first core region, and
        a cladding region formed around the second core region and having a refractive index higher than the refractive index of the second core region and lower than the refractive index of the first core region,
        a ratio of diameter of the first core region to outer diameter of the second core region from 0.3 to 0.85, a relative refractive index difference between the first core region and the second core region from 1.6% to 3.0%, and a relative refractive index difference between the second core region and the cladding region from −1.2% to −0.2%; and a holding unit that holds the optical fiber in a state in which the optical fiber is stretched in its longitudinal direction to change optical characteristics of the optical fiber.

17. The optical device according to claim 16, wherein the optical fiber has chromatic dispersion varying in the longitudinal direction, and the holding unit holds the optical fiber in a state in which a stress that varies in the longitudinal direction to counterbalance a variation of the chromatic dispersion is applied to the optical fiber so that the chromatic dispersion become virtually uniform through a whole length of the optical fiber.

18. The optical device according to claim 16, wherein a plurality of optical fiber modules are provided, and optical fibers in the optical fiber modules have different optical characteristic.

* * * * *